US012774752B2

(12) United States Patent
Wang et al.

(10) Patent No.: US 12,774,752 B2
(45) Date of Patent: Oct. 27, 2026

(54) CONTROL VALVE

(71) Applicant: ZHEJIANG SANHUA AUTOMOTIVE COMPONENTS CO., LTD., Hangzhou (CN)

(72) Inventors: Lixin Wang, Hangzhou (CN); Yongpin Lu, Hangzhou (CN); Haijun Zhu, Hangzhou (CN); Long Lin, Hangzhou (CN); Yun Wang, Hangzhou (CN)

(73) Assignee: ZHEJIANG SANHUA AUTOMOTIVE COMPONENTS CO., LTD., Hangzhou (CN)

( * ) Notice: Subject to any disclaimer, the term of this patent is extended or adjusted under 35 U.S.C. 154(b) by 117 days.

(21) Appl. No.: 18/572,813

(22) PCT Filed: Jun. 23, 2022

(86) PCT No.: PCT/CN2022/100711
§ 371 (c)(1),
(2) Date: Dec. 21, 2023

(87) PCT Pub. No.: WO2022/268155
PCT Pub. Date: Dec. 29, 2022

(65) Prior Publication Data

US 2024/0288080 A1 Aug. 29, 2024

(30) Foreign Application Priority Data

Jun. 25, 2021 (CN) ......................... 202110712839.8
Jun. 25, 2021 (CN) ......................... 202110712845.3
Jun. 25, 2021 (CN) ......................... 202110712846.8

(51) Int. Cl.
*F16K 11/20* (2006.01)
*F16K 11/085* (2006.01)
*F16K 31/53* (2006.01)

(52) U.S. Cl.
CPC .......... *F16K 11/20* (2013.01); *F16K 11/0853* (2013.01); *F16K 31/535* (2013.01)

(58) Field of Classification Search
CPC ............................... F16K 11/20; F16K 31/535
See application file for complete search history.

(56) References Cited

U.S. PATENT DOCUMENTS 3,705,707 A * 12/1972 Scaramucci .......... F16K 5/0626 251/315.08
4,069,850 A 1/1978 Cremona
(Continued)

FOREIGN PATENT DOCUMENTS

CN 202884094 U 4/2013
CN 106439091 A 2/2017
(Continued)

OTHER PUBLICATIONS

CN112682541A English Machine Translation (Year: 2020).*
(Continued)

*Primary Examiner* — Nicole Gardner
(74) *Attorney, Agent, or Firm* — Yue (Robert) Xu; Apex Attorneys at Law, LLP

(57) ABSTRACT

A control valve includes a valve body, a first valve core, a second valve core, a first drive shaft, and a second drive shaft. The first valve core is in transmission connection with a first drive member via the first drive shaft; the second valve core is in transmission connection with a second drive member via the second drive shaft; the valve body includes a first limiting portion and a second limiting portion; the main body of the first valve core is of a spherical structure, and the first valve core can deflect around the first limiting portion; and/or the main body of the second valve core is of a spherical structure, and the second valve core can deflect around the second limiting portion.

19 Claims, 18 Drawing Sheets

(56) References Cited

U.S. PATENT DOCUMENTS

| | | | |
|---|---|---|---|
| 2019/0055878 A1 | 2/2019 | Russalian | |
| 2020/0284357 A1 | 9/2020 | Kuwahara et al. | |
| 2021/0080014 A1 | 3/2021 | Sato et al. | |

FOREIGN PATENT DOCUMENTS

| | | | |
|---|---|---|---|
| CN | 107830210 | A | 3/2018 |
| CN | 111828682 | A | 10/2020 |
| CN | 112343734 | A | 2/2021 |
| CN | 112682541 | A | 4/2021 |
| FR | 2313613 | A1 | 12/1976 |
| JP | S525096 | A | 1/1977 |
| JP | 2009275844 | A | 11/2009 |
| JP | 2019135396 | A | 8/2019 |

OTHER PUBLICATIONS

European Search Report issued on May 19, 2025 for the European counterpart application No. 22827647.3.

International Search Report for PCT/CN2022/100711 mailed Sep. 28, 2022, ISA/CN.

Japanese First Office Action issued on Dec. 3, 2024 for Japanese counterpart application No. 2023-578856.

* cited by examiner

CONTROL VALVE

The present application is the national phase of International Application No. PCT/CN2022/100711, titles "CONTROL VALVE", filed on Jun. 23, 2022, which claims the benefit of priorities to the following three Chinese Patent Applications, all of which are incorporated herein by reference in their entireties:

1. Chinese Patent Application No. 202110712839.8, titled "CONTROL VALVE" and filed with the China National Intellectual Property Administration on Jun. 25, 2021,
2. Chinese Patent Application No. 202110712845.3, titled "CONTROL VALVE" and filed with the China National Intellectual Property Administration on Jun. 25, 2021 and
3. Chinese Patent Application No. 202110712846.8, titled "CONTROL VALVE" and filed with the China National Intellectual Property Administration on Jun. 25, 2021.

FIELD

The present application relates to the technical field of fluid control, and in particular to a control valve.

BACKGROUND

Generally, a valve core of a control valve is driven to rotate by a driving device, to realize fluid control to multiple flow paths by the control valve. In the case that the control valve has two or more valve cores, an urgent problem to be solved is to realize stable cooperation between the valve core and the corresponding drive member.

SUMMARY

The object of the present application is to provide a control valve that facilitates the stable cooperation between a valve core and a corresponding drive member.

A control valve is provided according to the embodiments of the present application. The control valve includes a valve body and valve cores, where the valve cores includes a first valve core and a second valve core, the control valve has a first chamber and a second chamber in communication with each other, the first chamber and the second chamber are arranged along a direction intersecting with a height direction of the control valve, at least part of the first valve core is arranged in the first chamber and is rotatable, and at least part of the second valve core is arranged in the second chamber and is rotatable;

the valve body includes a bottom wall portion, a first position-limiting portion, and a second position-limiting portion, the bottom wall portion is located at a side of the valve cores in an axial direction of the valve cores, the first position-limiting portion is fixedly connected to the bottom wall portion, the second position-limiting portion is fixedly connected to the bottom wall portion, the first valve core includes a first matching portion that is in position-limiting fit with the first position-limiting portion, and the second valve core includes a second matching portion that is in position-limiting fit with the second position-limiting portion; and a main body of the first valve core is of a spherical structure, the first valve core is configured to be deflected around the first position-limiting portion, and there is an angle between an axis of the first valve core and an axis of a chamber wall of the first chamber; and/or, a main body of the second valve core is of a spherical structure, the second valve core is configured to be deflected around the second position-limiting portion, and there is an angle between an axis of the second valve core and an axis of a chamber wall of the second chamber.

In the control valve according to the embodiments of the present application, the valve cores of the control valve includes the first valve core and the second valve core, and the valve body includes the first position-limiting portion and the second position-limiting portion. The first position-limiting portion can be in position-limiting fit with the first matching portion of the first valve core to limit the first valve core, and the second position-limiting portion can be in position-limiting fit with the second matching portion of the second valve core to limit the second valve core. The main body of the first valve core and/or the main body of the second valve core is configured as the spherical structure, which facilitates the deflection of the valve core of the spherical structure around the corresponding position-limiting portion. During the assembly process of the control valve, the deflection of the valve core can facilitate the transmission connection between the drive shaft and the corresponding drive member, so as to reduce the instability between the valve core and the corresponding drive member.

BRIEF DESCRIPTION OF THE DRAWINGS

FIG. 9-1 is a schematic view showing the structure of a first valve core according to an embodiment of the present application;

FIG. 9-2 is a schematic view of FIG. 9-1 from another perspective;

DETAILED DESCRIPTION OF THE EMBODIMENTS

Features and exemplary embodiments of various aspects of the present application are described in detail below. In order to make the purposes, technical solutions and advantages of the present application clearer, the present application is further described in detail below in conjunction with the drawings and specific embodiments. In this specification, relational terms such as "first" and "second" are only used to distinguish one component from another component with a same name, and do not necessarily require or imply any actual relationship or order between the components.

Figure 1:
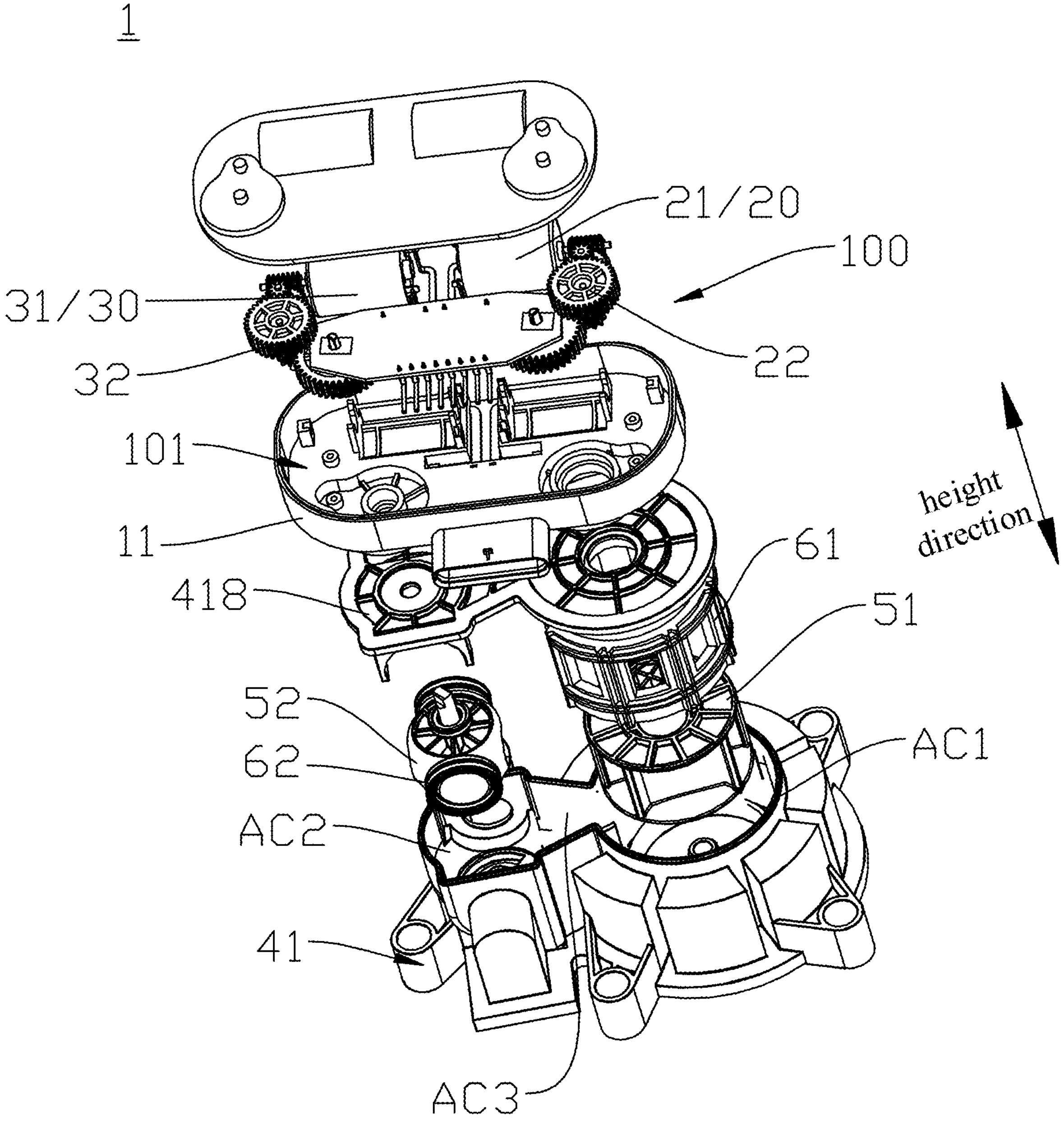
FIG. 1 is a schematic exploded view showing the structure of a control valve according to an embodiment of the present application.
Figure 2:
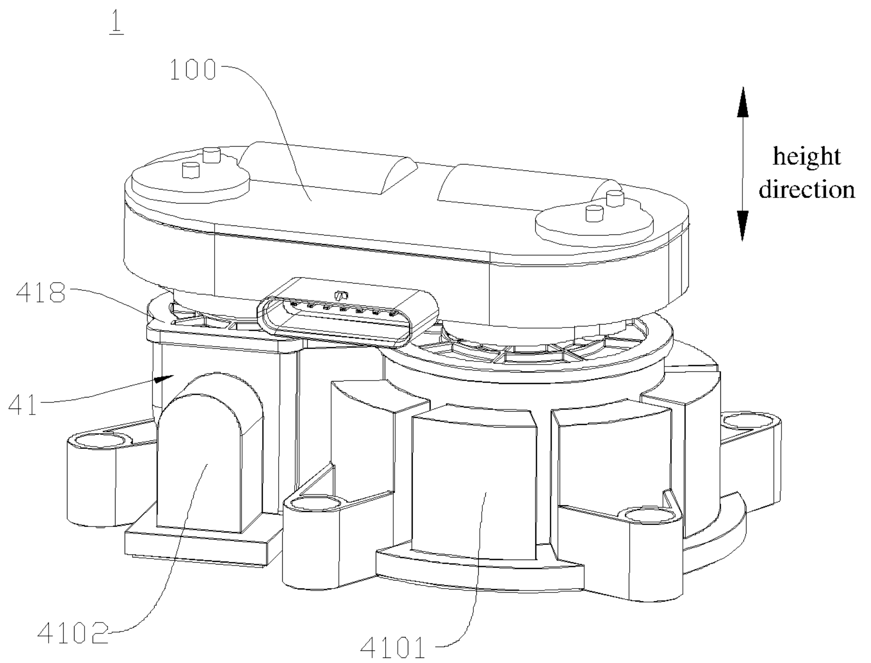
FIG. 2 is a schematic three-dimensional view showing the structure of the control valve according to the embodiment of the present application from one perspective.
Figure 3:
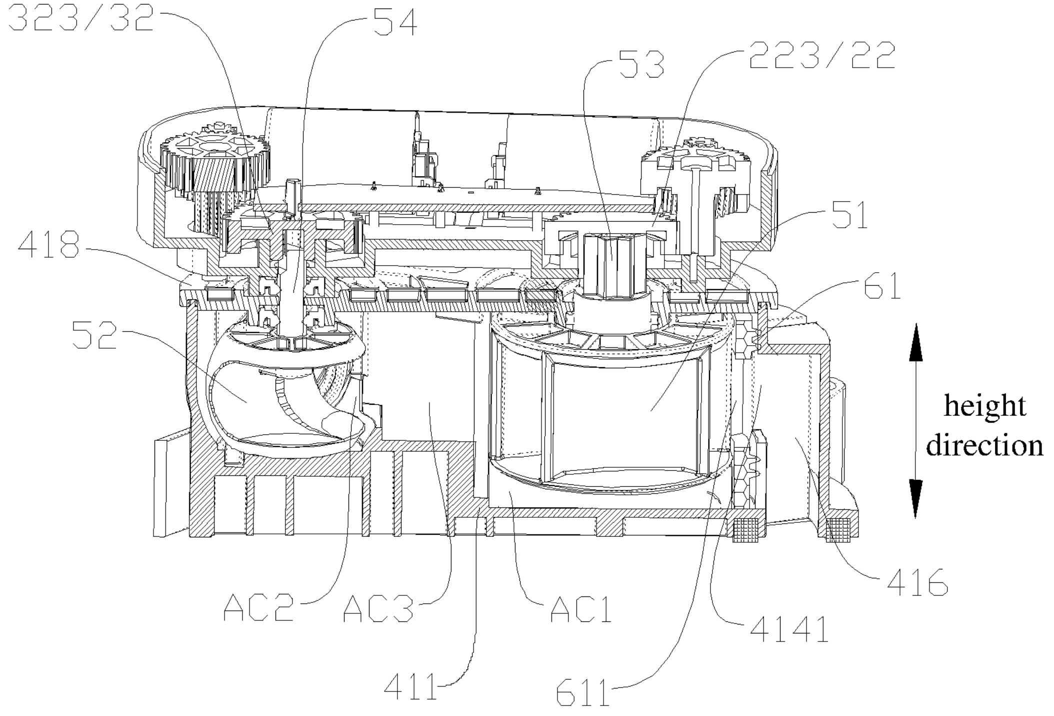
FIG. 3 is a partial cross-sectional view of the control valve shown in FIG. 2 being sectioned at one position.
Figure 4:
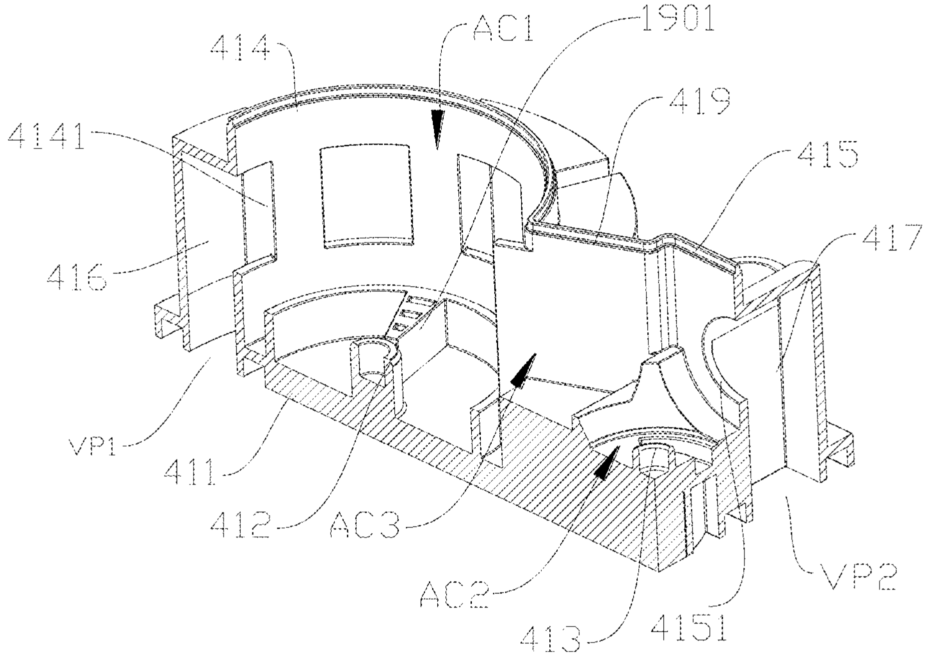
FIG. 4 is a partial cross-sectional view of a valve body according to an embodiment of the present application.

As shown in FIGS. 1 to 4, a control valve 1 is provided according to an embodiment of the application, which includes a driving assembly 100, a valve body 41, and at least two valve cores. The at least two valve cores includes a first valve core 51 and a second valve core 52, and at least part of the first valve core 51 and at least part of the second valve core 52 are arranged in the valve body 41. Communication between ports of the control valve 1 corresponding to communication cavities of the valve cores can be allowed or cut off by rotating the valve cores. In an embodiment, both the first valve core 51 and the second valve core 52 can be driven by the driving assembly 100 to rotate independently, so that different ports of the control valve 1 can be communicated by the communication cavities of the two valve cores, to realize the control of fluid by the control valve 1. Further, the first valve core 51 and the second valve core 52 are arranged along a direction intersecting with a height direction of the control valve 1. As shown in FIGS. 1 and 3, the direction along which the first valve core 51 and the second valve core 52 are arranged is perpendicular to the height direction of the control valve 1. The valve body 41 includes a bottom wall portion 411, a cover portion 418, and a side wall portion, at least part of the side wall portion is located between the bottom wall portion 411 and the cover portion 418. One of the bottom wall portion 411 and the cover portion 418 may be integrally formed with the side wall portion, the other of the bottom wall portion 411 and the cover portion 418 may be arranged with the side wall portion in a sealed manner through a welding process. In an embodiment of the present application, the bottom wall portion 411 is integrally formed with the side wall portion, and the cover portion 418 is welded with the side wall portion. At least part of the first valve core 51 and at least part of the second valve core 52 are located between the cover portion 418 and the bottom wall portion 411. Both the bottom wall portion 411 and the cover portion 418 are arranged with the side wall portion in a sealed manner, to prevent the leakage of fluid in the control valve. Along the height direction of the control valve 1, the driving assembly 100 is located on a side of the valve body 41. In FIG. 4, the driving assembly 100 is located at a side of the cover portion 418 facing away from the bottom wall portion 411. The driving assembly 100 can drive the first valve core 51 and the second valve core 52 to rotate. It can be understood that the number of valve cores in the embodiment of the present application is two. In specific implementation, the number of valve cores may be set according to requirements of user. For example, the number of valve cores may be three or four and so on, which is not limited in the present application.

With further reference to FIGS. 1 to 5, the control valve 1 has a first chamber AC1, a second chamber AC2, and a communication hole channel AC3 for communicating the first chamber AC1 with the second chamber AC2. The first chamber AC1 and the second chamber AC2 are arranged along a direction intersecting with the height direction of the control valve 1. For example, in FIG. 3, the direction along which the first chamber AC1 and the second chamber AC2 are arranged is perpendicular to the height direction of the control valve 1. At least part of the first valve core 51 is arranged in the first chamber AC1 and the first valve core 51 can be driven to rotate, and at least part of the second valve core 52 is arranged in the second chamber AC2 and the second valve core 52 can be driven to rotate. As shown in FIG. 4, the side wall portion of the valve body 41 includes a first side wall portion 414 and a second side wall portion 415, and the first side wall portion 414 and the second side wall portion 415 are fixedly connected and sealed with each other, or the first side wall portion 414 and the second side wall portion 415 are integrally formed. The first side wall portion 414 is a peripheral wall of the first chamber AC1 or at least part of the peripheral wall, and the second side wall portion 415 is a peripheral wall of the second chamber AC2 or at least part of the peripheral wall. One end of the communication hole channel AC3 forms a communication opening in the first side wall portion 414, and the other end of the communication hole channel AC3 forms a communication opening in the second side wall portion 415, so as to communicate the first chamber AC1 with the second chamber AC2. Further referring to FIG. 4, the valve body 41 may further include a connecting wall portion 419 connecting the first side wall portion 414 and the second side wall portion 415. The connecting wall portion 419 may be located between the first side wall portion 414 and the second side wall portion 415. The connecting wall portion 419 is a peripheral wall of the communication hole channel AC3 or at least part of the peripheral wall of the communication hole channel AC3. Optionally, the first side wall portion 414, the second side wall portion 415, and the connecting wall portion 419 may be integrally formed to improve the sealing performance of the valve body 41. Along a direction from the first chamber AC1 to the second chamber AC2, the diameter of the communication hole channel AC3 increases gradually, so that the communication hole channel AC3 has a relatively large flow area, which is beneficial for reducing the flow resistance of fluid.

Figure 5:
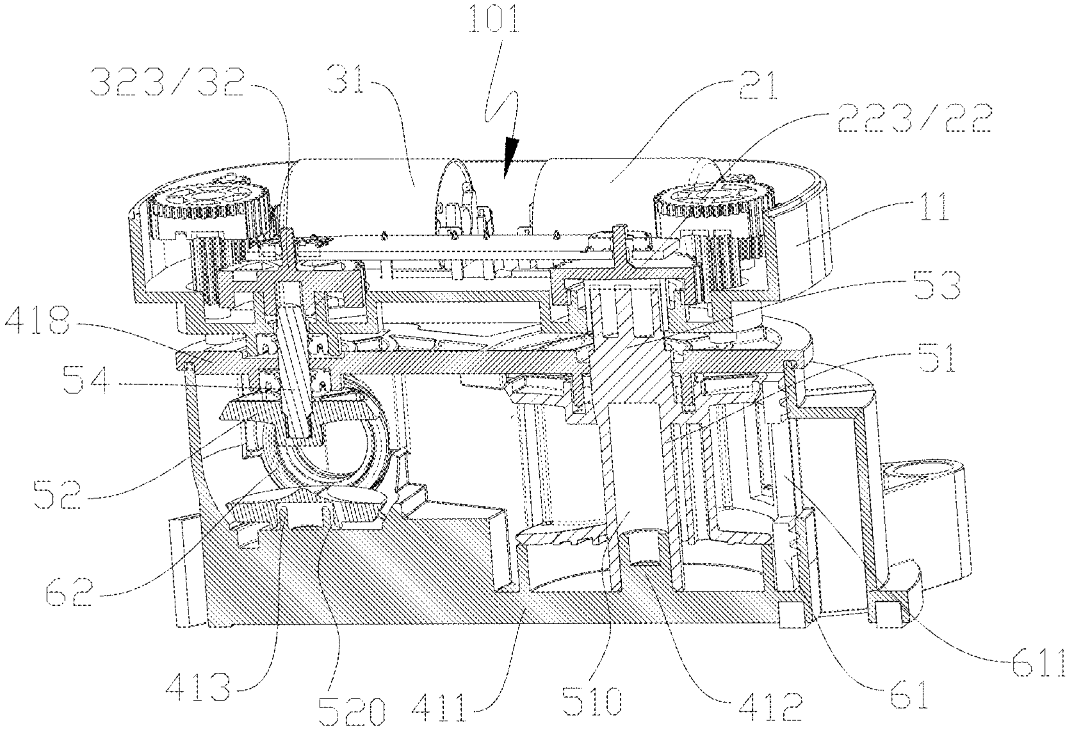
FIG. 5 is a partial cross-sectional view of the control valve shown in FIG. 2 being sectioned at another position.
Figure 6:
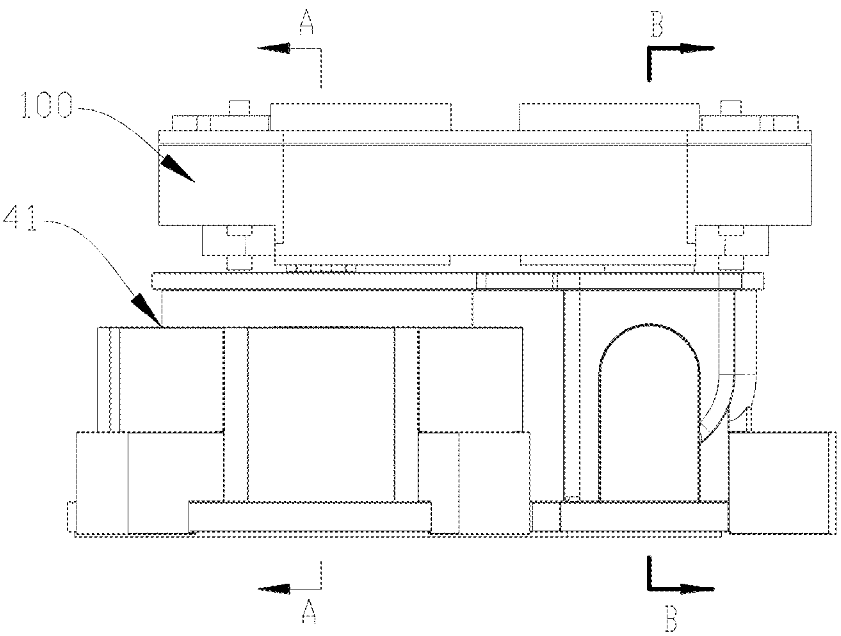
FIG. 6 is a schematic orthographic view of the control valve shown in FIG. 2.
Figure 7:
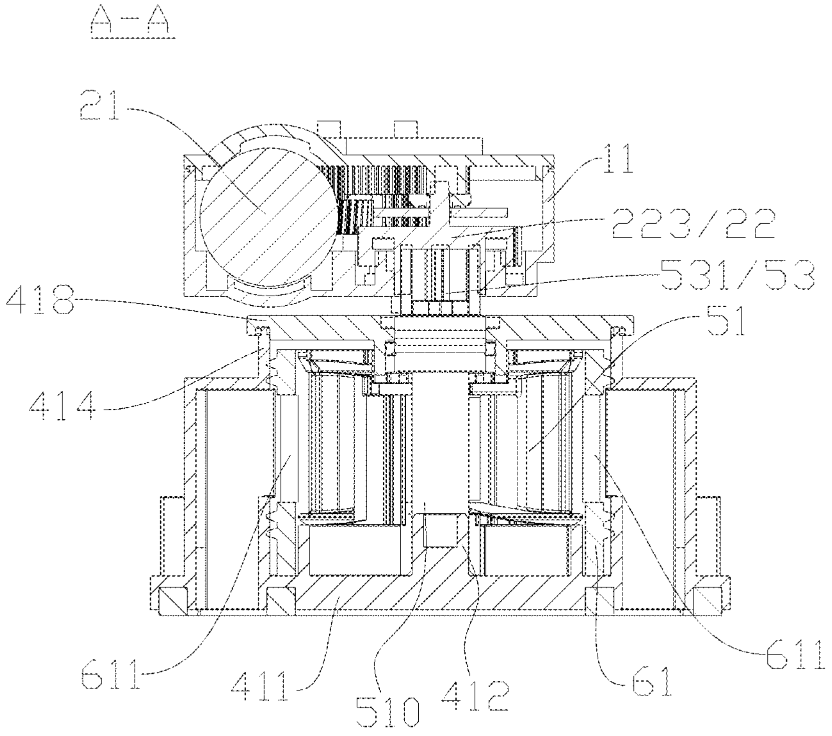
FIG. 7 is a schematic cross-sectional structural view, taken along line A-A, of the control valve shown in FIG. 6.
Figure 8:
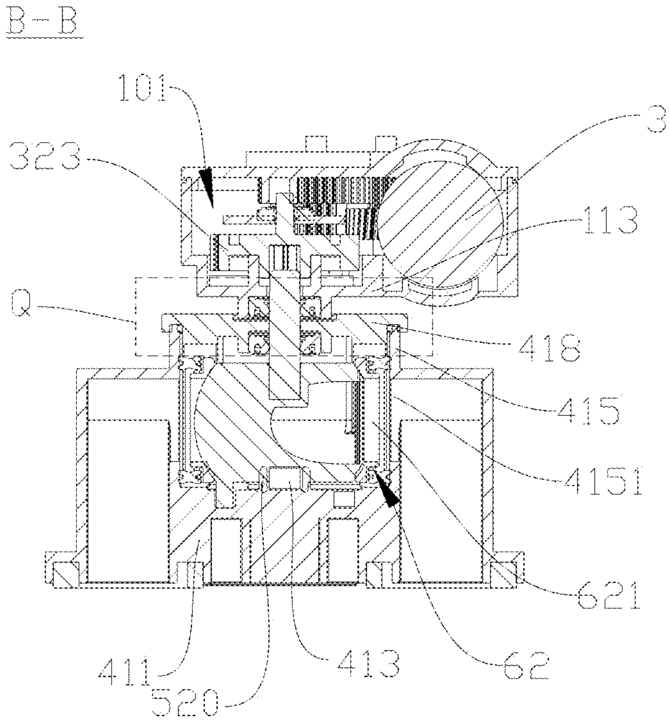
FIG. 8 is a schematic cross-sectional structural view, taken along line B-B, of the control valve shown in FIG. 6.

With reference to FIGS. 4 and 5, in some embodiments, the control valve 1 has at least five channels. In an embodiment of the present application, the control valve 1 may have nine channels, the nine channels includes first channels 416 and second channels 417. One end of each first channel 416 runs through the first side wall portion 414 to form a first communication port 4141, the first communication port 4141 communicates with the first chamber AC1, and the other end of the first channel 416 runs through an outer surface of the control valve 1 to form a first end port VP1, so that the fluid can enter or leave the control valve 1 through the first end port VP1. One end of each second channel 417 runs through the second side wall portion 415 to form a second communication port 4151, the second communication port 4151 communicates with the second chamber AC2, and the other end of the second channel 417 runs through the outer surface of the control valve 1 to form a second end port VP2, so that the fluid can enter or leave the control valve 1 through the second end port VP2. In the control valve 1 according to the embodiment of the present application, by rotating the first valve core 51 and/or the second valve core 52, at least two first communication ports 4141 can be communicated through the communication cavity of the first valve core 51, so as to realize the communication between multiple first end ports VP1, and the first communication port 4141 and the second communication port 4151 can be communicated through the communication cavity of the first valve core 51 and the communication cavity of the second valve core 52, so as to realize various communication modes between the first end ports VP1 and the second end ports VP2, thereby realizing the control function of the control valve 1 on the fluid.

As shown in FIGS. 1 and 5 to 8, the driving assembly 100 includes a housing 10, a first drive member 20, and a second drive member 30. The housing 10 has an accommodation cavity 101, and the first drive member 20 and the second drive member 30 are arranged in the accommodation cavity 101. The first drive member 20 includes a first motor 21 and a first transmission gear set 22. The first motor 21 includes a first output shaft, and the first output shaft is in transmission connection with the first transmission gear set 22 through a worm structure. The first transmission gear set 22 includes a first output gear 223, and the power output by the first motor 21 can be transmitted to the first output gear 223 to drive the first valve core 51 to rotate. The second drive member 30 includes a second motor 31 and a second transmission gear set 32, the second motor 31 includes a second output shaft, and the second output shaft is in transmission connection with the second transmission gear set 32 through a worm structure. The second transmission gear set 32 includes a second output gear 323, and the power output by the second motor 31 can be transmitted to the second output gear 323 to drive the second valve core 52 to rotate. It should be noted that the transmission connection herein may be a fixed connection through a welding process, a fastener, and so on, or may be two parts being formed by integral molding, as long as the two parts can be rotated synchronously.

In order to drive the first valve core 51 and the second valve core 52 to rotate independently, referring to FIGS. 1 and 5 to 8, the control valve 1 further includes a first drive shaft 53 and a second drive shaft 54. The first drive shaft 53 and the first valve core 51 are of an integrated structure or in transmission connection with each other. The second drive shaft 54 and the second valve core 52 are of an integrated structure or in transmission connection with each other. The first valve core 51 is in transmission connection with the first drive member 20 through the first drive shaft 53, and the second valve core 52 is in transmission connection with the second drive member 30 through the second drive shaft 54.

Since the control valve according to the present application includes the first valve core 51, the second valve core 52, and the first drive member 20 and the second drive member 30 connected to the two valve cores respectively, in order to avoid the unstable connection between the valve cores and the corresponding drive members caused by errors in the assembly or the manufacturing process of the control valve, with continued reference to FIGS. 1 to 10 and 16, the valve body 41 includes a bottom wall portion 411, a first position-limiting portion 412, and a second position-limiting portion 413. The bottom wall portion 411 is located at a side of the valve core facing away from the driving assembly 100, the first position-limiting portion 412 is located in the first chamber AC1 and fixedly connected to the bottom wall portion 411, and the second position-limiting portion 413 is located in the second chamber AC2 and fixedly connected to the bottom wall portion 411. The first valve core 51 includes a first matching portion 510 matching the first position-limiting portion 412 in a nested manner, and the second valve core 52 includes a second matching portion 520 matching the second position-limiting portion 413 in a nested manner. In an embodiment, one of the first position-limiting portion 412 and the first matching portion 510 is of a protrusion structure, the other of the first position-limiting portion 412 and the first matching portion 510 is of a groove structure, one of the second position-limiting portion 413 and the second matching portion 520 is of a protrusion structure, and the other of the second position-limiting portion 413 and the second matching portion 520 is of a groove structure. The protrusion structure is inserted in the groove structure for position-limiting fit. A main body of the first valve core 51 is of a spherical structure, and the first valve core 51 is configured to be deflected around the first position-limiting portion 412, so that there is an angle between an axis of the first valve core 51 and an axis of a chamber wall of the first chamber AC1, in the case that the first drive shaft 53 and the first valve core 51 are of an integrated structure, there may also be an angle between an axis of the first drive shaft 53 and the axis of the chamber wall of the first chamber AC1; and/or, a main body of the second valve core 52 is of a spherical structure, the second valve core 52 is configured to be deflected around the second position-limiting portion 413, so that there is an angle between an axis of the second valve core 52 and an axis of a chamber wall of the second chamber AC2, in the case that the second drive shaft 54 and the second valve core 52 are of an integrated structure, there is an angle between an axis of the second drive shaft 54 and the axis of the chamber wall of the second chamber AC2. The valve cores are configured to drive the drive shafts to deflect around the corresponding position-limiting portions, the transmission connection between the drive shafts and the corresponding drive members can be realized by the deflection of the valve cores during the assembly process of the control valve 1, in this way, the unstable fits between the two valve cores and the corresponding two drive members caused by manufacturing or assembly errors of the control valve 1 can be alleviated, which facilitates the stable rotation of at least two valve cores of the control valve 1, and thereby improving the stability of the control valve 1.

In some embodiments, the first drive shaft 53 and the first valve core 51 are of an integrated structure. For example, the first drive shaft 53 and the first valve core 51 may be integrally formed by injection molding, the second drive shaft 54 and the second valve core 52 are separately arranged and in transmission connection with each other. For example, in FIG. 5, the second valve core 52 has a drive shaft mounting hole, and the second drive shaft 54 is inserted in the drive shaft mounting hole and is in interference fit with the drive shaft mounting hole; the main body of the first valve core 51 is of a column structure, and the first valve core 51 and the first drive shaft 53 are limited by the first position-limiting portion 412, and both the first valve core 51 and the first drive shaft 53 are arranged coaxially with the chamber wall of the first chamber AC1. The main body of the second valve core 52 is of a spherical structure, and the second valve core 52 drives the second drive shaft 54 to deflect around the second position-limiting portion 413, so that there is an angle between the axis of the second drive shaft 54 and the axis of the second chamber AC2.

Figures 1, 9:
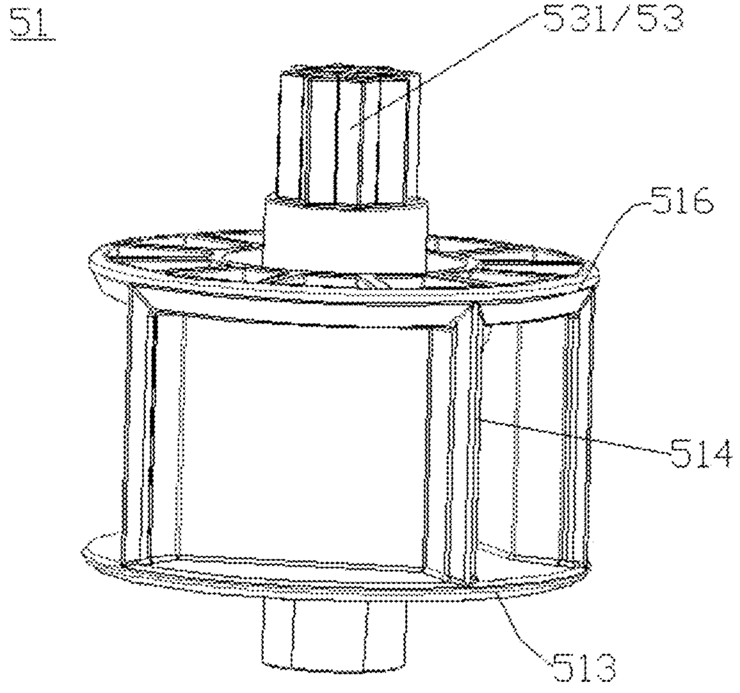
Figures 2, 9:
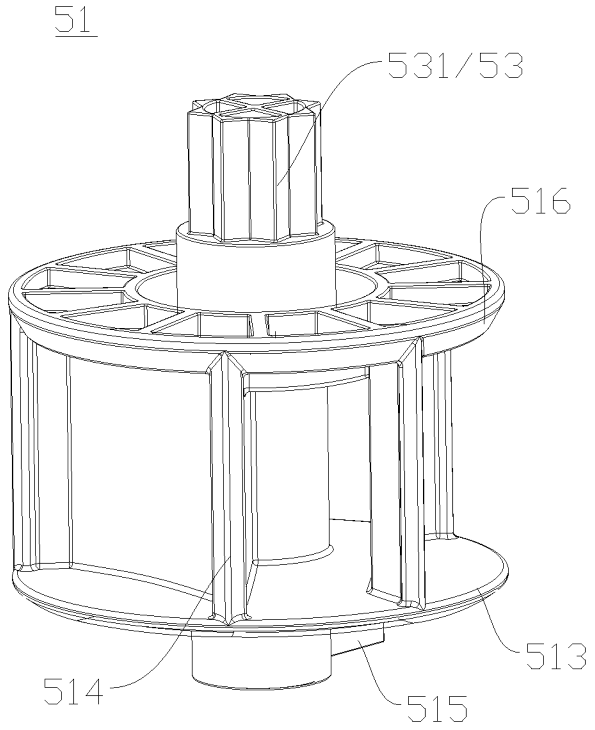
Figure 10:
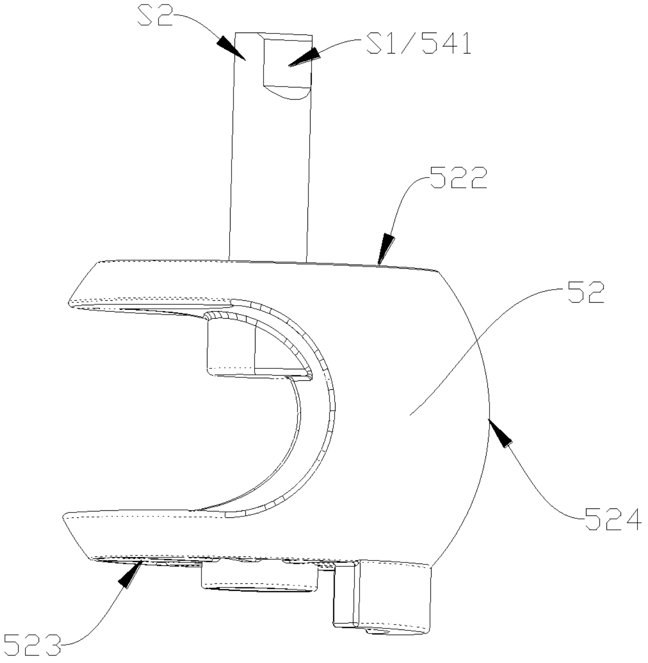
FIG. 10 is a schematic view showing a combined structure of a second valve core and a second drive shaft according to an embodiment of the present application.
Figure 11:
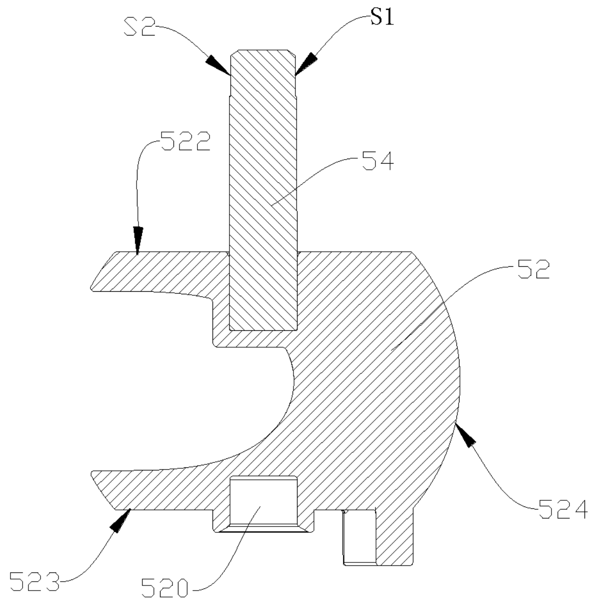
FIG. 11 is a schematic cross-sectional view of the combined structure of the second valve core and the second drive shaft shown in FIG. 10.
Figure 12:
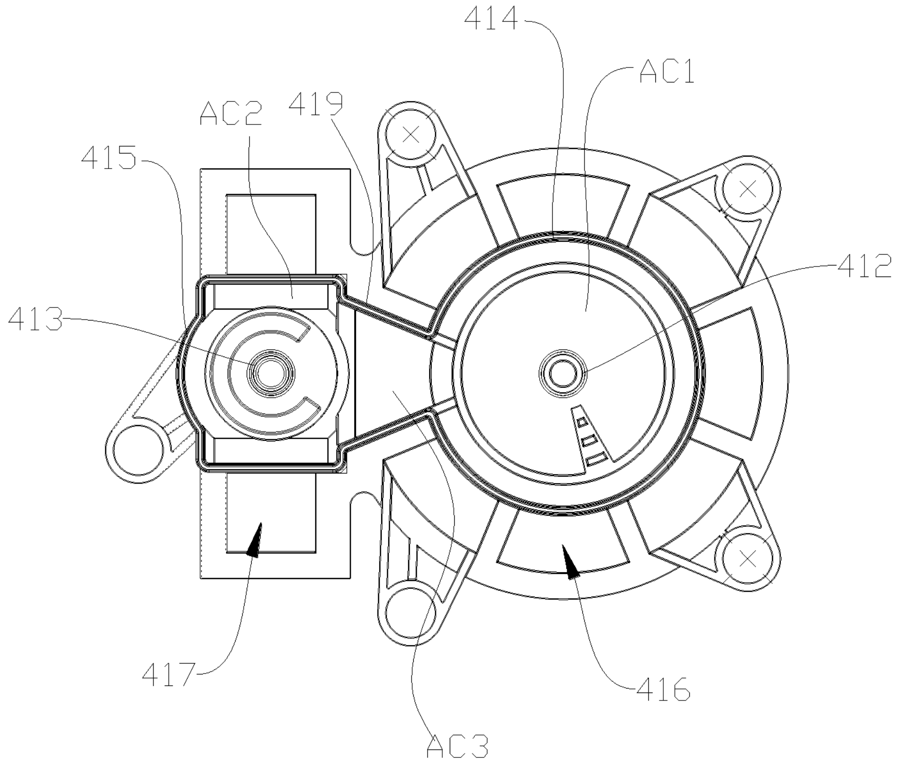
FIG. 12 is a partial schematic structural view of a valve body according to an embodiment of the present application.
Figure 13:
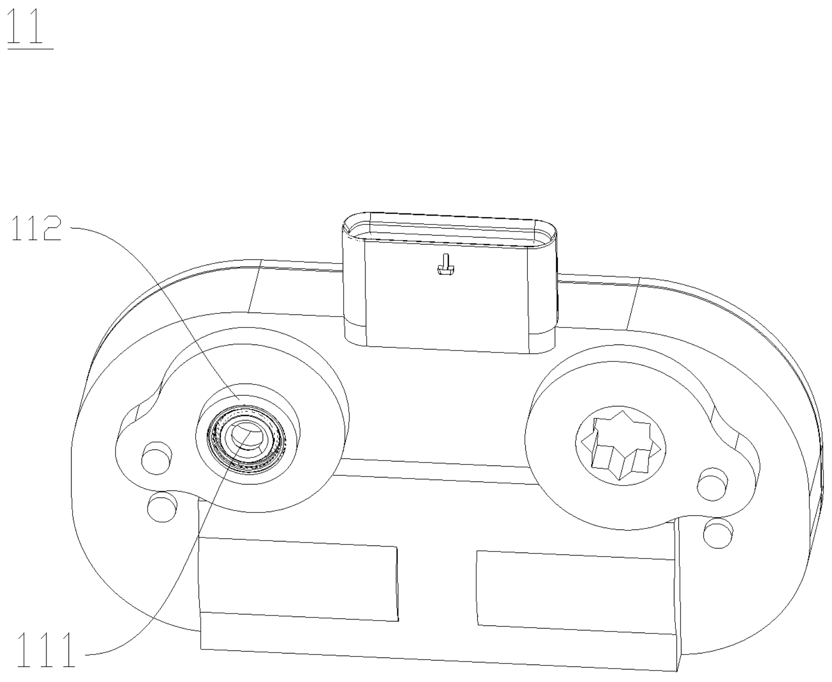
FIG. 13 is a schematic view showing the structure of a lower housing according to an embodiment of the present application.
Figure 14:
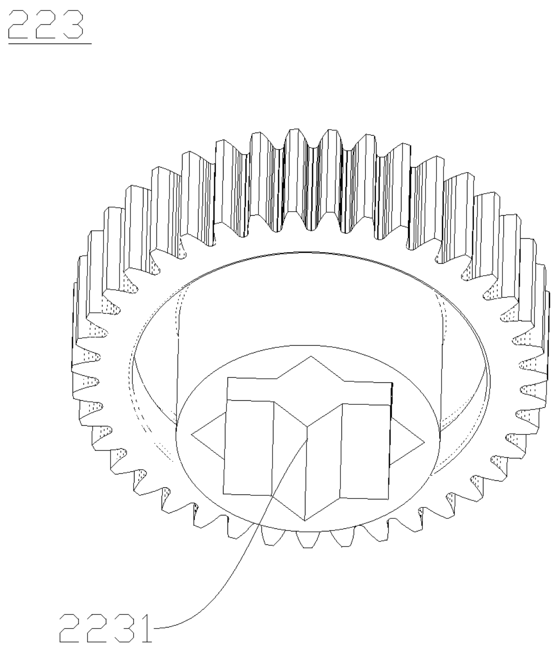
FIG. 14 is a schematic view showing the structure of a first output gear according to an embodiment of the present application.

In order to achieve the sealing performance of the control valve 1, as shown in FIGS. 1 and 5 to 8, in some embodiments, the control valve 1 further includes a first seal 61 and a second seal 62. The first seal 61 has first hole channels 611, the number of the first hole channels 611 is the same as the number of the first communication ports 4141 and the first hole channels 611 communicate with the first communication ports 4141. The first seal 61 is sandwiched between the first side wall portion 414 and the first valve core 51, the first seal 61 is coaxially arranged with the first valve core 51, and a height of the first seal 61 matches a height of the main body of the first valve core 51. The number of the second seal 62 is the same as the number of the second communication port 4151. The second seal 62 has a second hole channel 621, the second hole channel 621 communicates with the second communication port 4151. The second seal 62 is sandwiched between part of a side surface of the second valve core 52 and part of a wall surface of the second side wall portion 415. There is a gap between another part of the side surface of the second valve core 52 and another part of the wall surface of the second side wall portion 415. There is a gap between an end face of the main body of the second valve core 52 and the valve body 41 along the height direction of the control valve 1, which makes it convenient for the second valve core 52 to drive the second drive shaft 54 to deflect around the second position-limiting portion 413, so as to form the angle between the axis of the second drive shaft 54 and the axis of the second chamber AC2, thereby facilitating the connection of the first valve core 51 and the second valve core 52 with the corresponding drive members through the corresponding drive shafts. It can be understood that the main body of the first valve core 51 is of a structure with communication cavities. As shown in FIGS. 9-1 and 9-2, the main body of the first valve core 51 includes a top plate 516, a bottom plate 513, and multiple partitions 514 located between the top plate 516 and the bottom plate 513. The top plate 516, the bottom plate 513, and the multiple partitions 514 define the communication cavities of the first valve core 51. The main body of the second valve core 52 is of a structure with a communication cavity. As shown in FIG. 10, the main body of the second valve core 52 has a top surface 522 and a bottom surface 523 disposed opposite to each other, and a spherical surface 524 located between the top surface 522 and the bottom surface 523. The second valve core 52 is located between the top surface 522 and the bottom surface 523.

Figure 15:
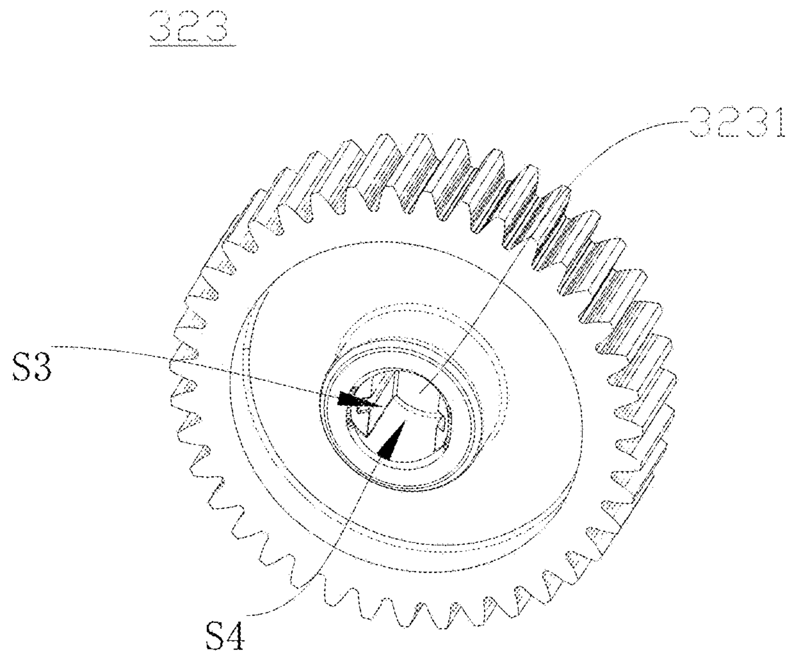
FIG. 15 is a schematic view showing the structure of a second output gear according to an embodiment of the present application.

As shown in FIGS. 7 to 15, in some embodiments, the number of the channels of the control valve 1 is nine, the number of the first channels 416 is seven, and the number of the second channels 417 is two. The first drive shaft 53 includes a toothed portion 531, the first drive member 20 includes a first output gear 223, the first output gear 223 has a toothed hole 2231, and the toothed portion 531 is inserted into the toothed hole 2231. As shown in FIGS. 10 and 15, the second drive shaft 54 includes a connecting portion 541, at least part of an outer surface of the connecting portion 541 includes two non-arc-shaped surfaces S1 arranged opposite to each other and an arc-shaped surface S2 located between the two non-arc-shaped surfaces S1, the second drive member 30 includes a second output gear 323, the second output gear 323 has a connecting hole 3231, and at least part of a hole wall surface of the connecting hole 3231 includes two non-arc-shaped wall surfaces S3 arranged opposite to each other and an arc-shaped wall surface S4 located between the two non-arc-shaped wall surfaces S3. Each of the two non-arc-shaped wall surfaces S3 is arranged close to and to face a corresponding non-arc-shaped surface S1, and the connecting portion 541 is inserted into the connecting hole 3231. Through the above arrangement, the synchronous rotation of the first valve core 51 and the second valve core 52 with the corresponding drive members can be realized, and the adjustment of the angle deflection of the second drive shaft 54 can be realized.

According to FIGS. 7 to 11 and 16, in an embodiment of the present application, the first position-limiting portion 412 is a first protrusion, the first protrusion protrudes from the bottom wall portion 411, the first matching portion 510 is a first groove, and the first groove extends from a surface of the first valve core 51 facing the bottom wall portion 411 toward an interior of the first valve core 51, and the first protrusion is inserted in the first groove The second position-limiting portion 413 is a second protrusion, the second protrusion protrudes from the bottom wall portion 411, the second matching portion 520 is a second groove, the second groove extends from a surface of the second valve core 52 facing the bottom wall portion 411 toward an interior of the second valve core 52, the second protrusion is inserted in the second groove, and the second protrusion is in clearance fit with the second groove. A tolerance between an outer wall surface of the second protrusion and an inner wall surface of the second groove is ±0.06 mm, in this case, a distance d1 between the outer wall surface of the second protrusion and the inner wall surface of the second groove satisfies: $0 \leq d1 \leq 0.06$ mm.

Figure 16:
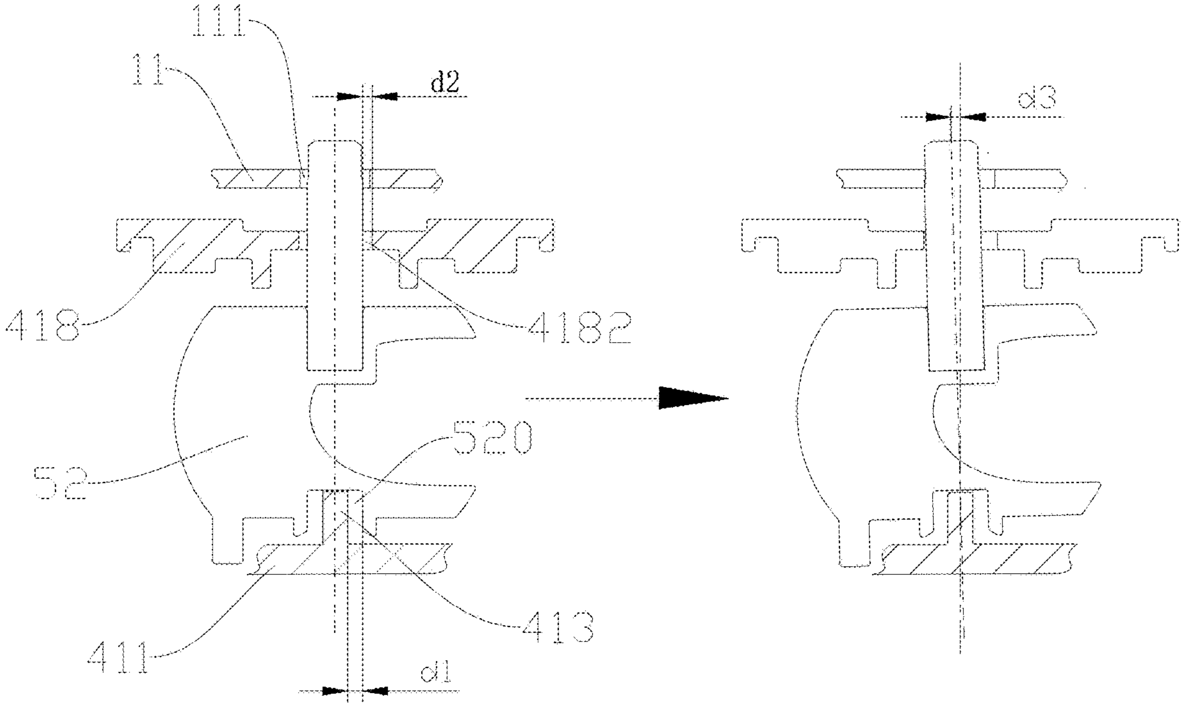
FIG. 16 is a schematic view showing a second valve core, a distance between a second drive shaft and a cover portion, a distance between the second drive shaft and a lower housing, and the deflection principle of the second valve core according to an embodiment of the present application.
Figure 17:
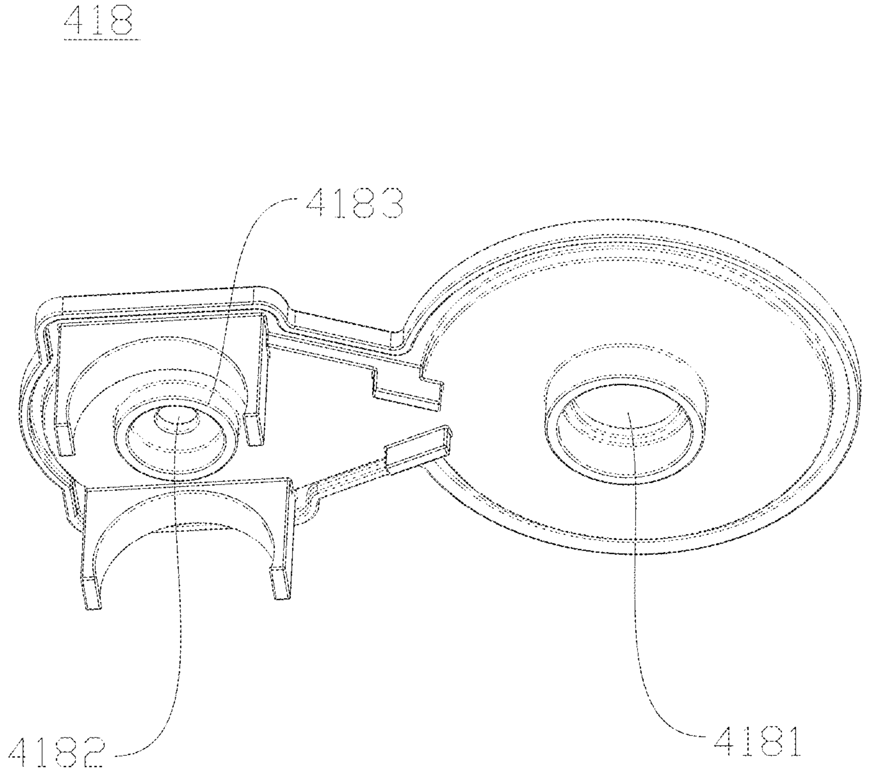
FIG. 17 is a schematic view showing the structure of a cover portion according to an embodiment of the present application.
Figure 18:
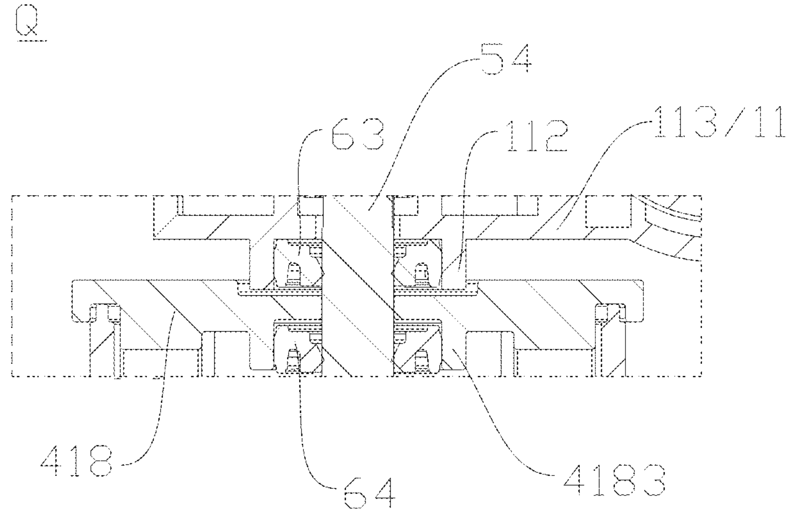
FIG. 18 is a schematic view showing the enlarged structure of portion Q in FIG. 8.
Figure 19:
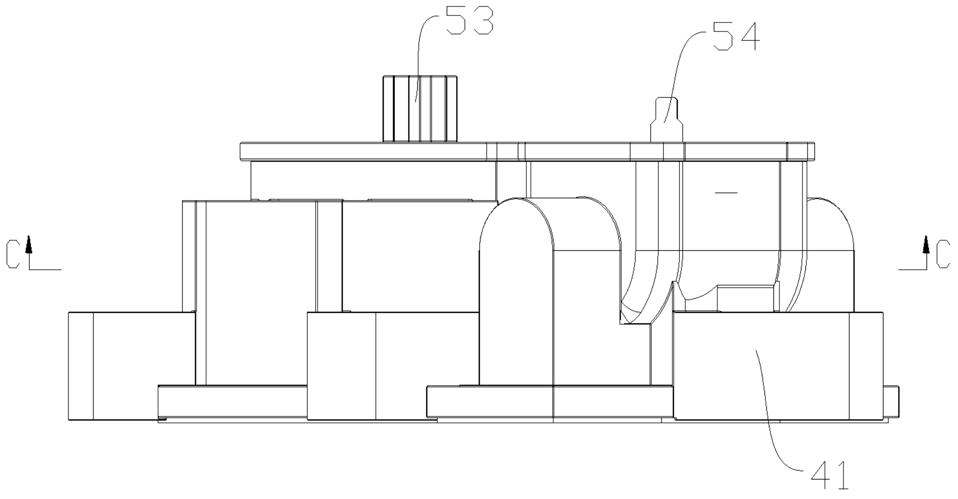
FIG. 19 is a partial front view of the control valve shown in FIG. 2.

Based on this, referring to FIGS. 5, 16, and 17, in the case that the valve body 41 further includes a cover portion 418, and the cover portion 418 has a first through hole 4181 and a second through hole 4182. The first drive shaft 53 runs through the first through hole 4181 to be in transmission connection with the first output gear 223, and the second drive shaft 54 runs through the second through hole 4182 to be in transmission connection with the second output gear 323. The first through hole 4181 is arranged coaxially with the first output gear 223 and the first drive shaft 53. The second through hole 4182 is in clearance fit with the second drive shaft 54, and a tolerance between a hole wall of the second through hole 4182 and a shaft surface, corresponding to the second through hole 4182 in position, of the second drive shaft 54 is ±0.05 mm, that is, a distance d2 between the hole wall of the second through hole 4182 and the shaft surface, corresponding to the second through hole 4182 in position, of the second drive shaft 54 satisfies: 0≤d2≤0.05 mm.

Based on the above structural arrangement, with the spherical structure of the main body of the second valve core 52, the gap structure between the second valve core 52 and the valve body 41, and distances of d1 and d2, the second valve core 52 can drive the second drive shaft 54 to deflect. In some embodiments, a tolerance between a midpoint of a surface, facing away from the second valve core 52, of the second drive shaft 54 and the axis of the chamber wall of the first chamber AC1 is ±0.1 mm, that is, a distance d3 between the midpoint of the surface, facing away from the second valve core 52, of the second drive shaft 54 and the axis of the chamber wall of the first chamber AC1 satisfies: 0≤d3≤0.1 mm. Through the above arrangement, the assembly accuracy of the first valve core 51 and the second valve core 52 can be ensured, and the stability of the control valve can be improved.

Further, as shown in FIGS. 8, 13, 17, and 18, in some embodiments, the lower housing 11 of the driving assembly 100 has a third through hole 111, the second drive shaft 54 runs through the second through hole 4182 of the cover portion 418 and the third through hole 111 of the lower housing 11 to be in transmission connection with the second output gear 323. The control valve 1 further includes a first oil seal 63 and a second oil seal 64, and the first oil seal 63 and the second oil seal 64 are respectively arranged on both sides of the cover portion 418 in a thickness direction of the cover portion 418. Both the first oil seal 63 and the second oil seal 64 are sleeved on an outer peripheral side of the second drive shaft 54. The cover portion 418 has a first protruding portion 4183 disposed toward the second valve core 52, and the second oil seal 64 is sandwiched between the first protruding portion 4183 and the second drive shaft 54. The lower housing 11 further includes a bottom housing portion 113 and a second protruding portion 112. The bottom housing portion 113 forms a wall of the accommodation cavity 101 or at least part of the wall of the accommodation cavity 101, and at least part of the second protruding portion 112 is located on one side of the bottom housing portion 113 facing away from the second output gear 323. The first oil seal 63 is sandwiched between the bottom housing portion 113 and the second drive shaft 54, and a compression space is respectively provided between the first oil seal 63 and an outer surface of the second drive shaft 54, and between the second oil seal 64 and the outer surface of the second drive shaft 54. Through the above arrangement, on one hand, the sealing performance of the control valve can be realized, and on the other hand, with the two oil seals and the corresponding compression spaces, it is convenient for the second valve core 52 to drive the second drive shaft 54 to deflect.

In a case that the control valve 1 has one valve core, the main body of the valve core is of a spherical structure. The specific configuration form of the valve core and position relations of a valve body and a housing that are connected to the valve core with the spherical structure are similar to the structure of the control valve according to any one of the above solutions, which is not limited by the present application. Through the above arrangement, the stable connection between the valve core and a corresponding drive member can be realized through the deflection of the valve core with the spherical structure. For example, the fitting accuracy between the valve core and the corresponding drive member can be improved, and good coaxiality of the valve core and the corresponding drive member can be realized.

Figure 22:
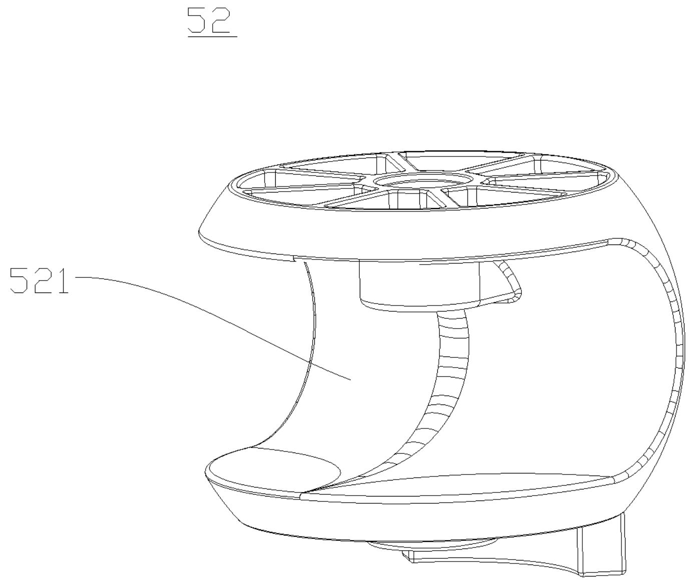
FIG. 22 is a schematic view showing the structure of a second valve core according to an embodiment of the present application.
Figure 23:
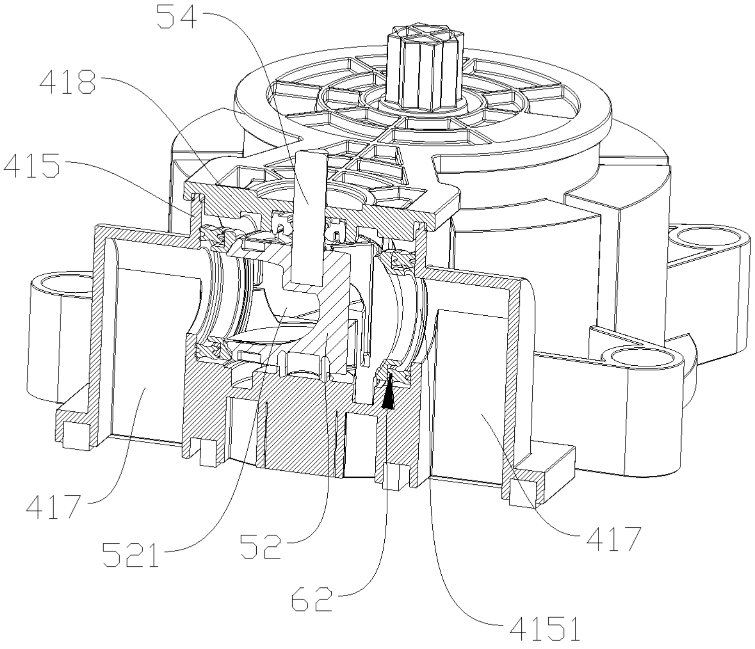
FIG. 23 is a partial cross-sectional view of the control valve shown in FIG. 2 being sectioned at another position.

Referring to FIGS. 19 to 23, the first valve core 51 includes a first communication cavity 511 and a second communication cavity 512 isolated as independent spaces. The first communication cavity 511 is of a groove structure recessed from an outer peripheral surface of the first valve core 51 toward the interior of the first valve core 51. The first communication cavity 511 runs through the outer peripheral surface of the first valve core 51 to form a first communication opening A1. The second communication cavity 512 runs through the first valve core 51, and in this way, the second communication cavity 512 runs through the outer peripheral surface of the first valve core 51 to form two second communication openings A2. A cross-sectional area of the first communication opening A1 is greater than a cross-sectional area of each of the two second communication openings A2. By providing the first communication cavity 511 and the second communication cavity 512, different communication modes between multiple valve ports can be realized via rotation of the first valve core 51. As shown in FIG. 22, the second valve core 52 includes a third communication cavity 521, the third communication cavity 521 is of a groove structure recessed from an outer peripheral surface of the second valve core 52 toward an interior of the second valve core 52.

Based on this, by rotating the first valve core 51, at least two corresponding first end ports VP1 can be communicated through the first communication port 4141 and at least one of the first communication cavity 511 and the second communication cavity 512. For example, when the first valve core 51 is rotated, at least two first end ports VP1 corresponding to the first communication cavity 511 can be communicated through the first communication cavity 511 and the first communication port 4141, and/or, when the first valve core 51 is rotated, at least two first end ports VP1 corresponding to the second communication cavity 512 can be communicated through the second communication cavity 512 and the first communication port 4141; and by rotating the first valve core 51 and the second valve core 52, the first end port VP1 and the second end port VP2 that are corresponding to each other can be communicated through either of the first communication cavity 511 and the second communication cavity 512, the first through port 4141, the communication hole channel AC3, the third communication cavity 521, and the second communication port 4151. In this way, the first valve core 51 can not only achieve communication between the at least two first end ports VP1, but also achieve communication between the first end port VP1, the communication hole channel AC3 and the second end port VP2. Through the above arrangement, multiple flow paths can be controlled by one control valve 1, which is more convenient and compact in use.

In order to realize the rotation of the first valve core 51 and the second valve core 52, further referring to FIGS. 19 to 23, in some embodiments, the control valve 1 further includes a first drive shaft 53 and a second drive shaft 54. The first drive shaft 53 is integrally formed with or in transmission connection with the first valve core 51, so that the first drive shaft 53 and the first valve core 51 can rotate synchronously. The second drive shaft 54 is integrally formed with or in transmission connection with the second valve core 52, so that the second drive shaft 54 and the second valve core 52 can rotate synchronously. When the first drive shaft 53 drives the first valve core 51 to rotate to any position, one of the first communication cavity 511 and the second communication cavity 512 communicates with the communication hole channel AC3, so that the fluid flowing in the first valve core 51 can always flow into the second cavity AC2 through the communication hole channel AC3. The second drive shaft 54 can drive the second valve core 52 to rotate to allow the third communication cavity 521 to communicate with at least one second end port VP2.

In order to facilitate the assembly of the control valve 1 and other components in a fluid control system, to improve the integration degree of the control valve 1 and other components, in some embodiments, the first end ports VP1 and the second end ports VP2 of the control valve 1 are located at a same surface, so that the valve ports of the control valve 1 are distributed on the same surface and the ports face the same direction, which can relatively simplify the assembly steps of the control valve 1 and other components. In other embodiments, the first end ports VP1 may be arranged in a circle along a circumferential direction of a side wall portion where the first end ports VP1 are located, and the second end ports VP2 may be arranged in a circle along a circumferential direction of a side wall portion where the second end ports VP2 are located.

In order to allow the first valve core 51 to communicate at least two first end ports VP1 and communicate the first end port VP1 with the communication hole channel AC3, in some embodiments, referring to FIGS. 9-1, 9-2, and 21, the main body of the first valve core 51 is of a column structure, and the first valve core 51 includes a top plate 516, a bottom plate 513, and a partition 514 located between the top plate 516 and the bottom plate 513. The top plate 516 and the bottom plate 513 are arranged along the height direction of the first valve core 51, each first communication cavity 511 runs through the outer peripheral surface of the first valve core 51 to form a first communication opening A1, and the second communication cavity 512 runs through the outer peripheral surface of the first valve core 51 to form two second communication openings A2. Along a circumferential direction of the first valve core 51, there is at least one first communication opening A1 located between the two second communication openings A2. Along a radial direction of the first valve core 51, the second communication cavity 512 is closer to the axis of the first valve core 51 than the first communication cavity 511. In implementation, as shown in FIGS. 9-1, 20 and 21, the first valve core 51 has three first communication cavities 511 and one second communication cavity 512. Two of the three first communication cavities 511 are adjacent to each other and located at one side of the first valve core 51 in the radial direction of the first valve core 51, and the second communication cavity 512 and the other one of the three first communication cavities 511 are located at the other side of the first valve core 51 in the radial direction of the first valve core 51. Further, in order to limit the rotation angle of the first valve core 51, the first valve core 51 further includes a first baffle 515 protruding from the bottom plate 513 along a direction away from the top plate 516. As shown in FIG. 4, the valve body 41 includes a stopper 1901 protruding from the bottom wall portion of the valve body 41 and located in the first chamber AC1. The stopper 1901 cooperates with the first baffle 515 to limit the rotation angle of the first valve core 51.

Figure 20:
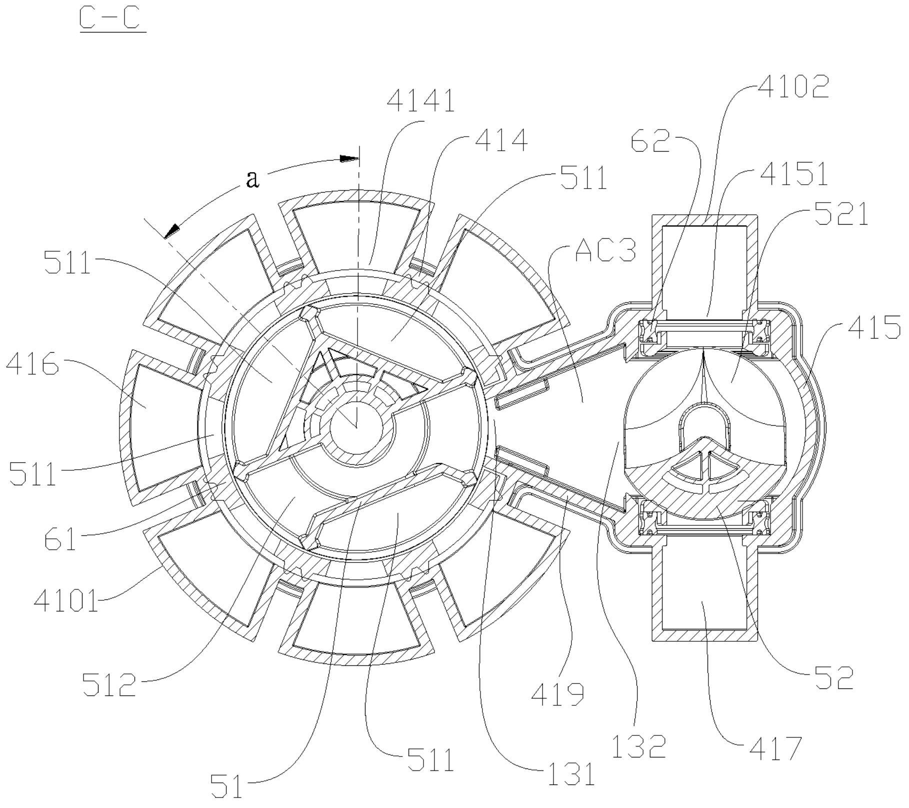
FIG. 20 is a schematic cross-sectional view of the control valve shown in FIG. 19 taken along line C-C.
Figure 21:
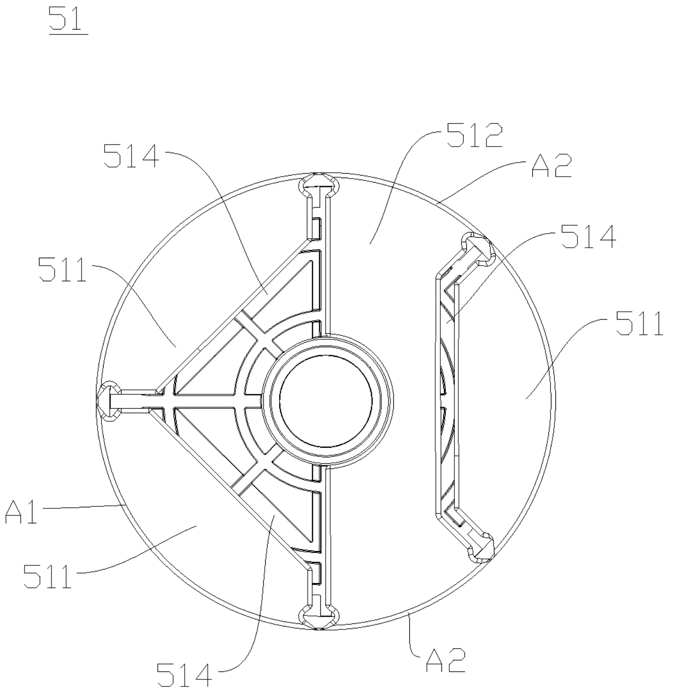
FIG. 21 is a schematic cross-sectional view of the first valve core shown in FIG. 9-1.
Figure 24:
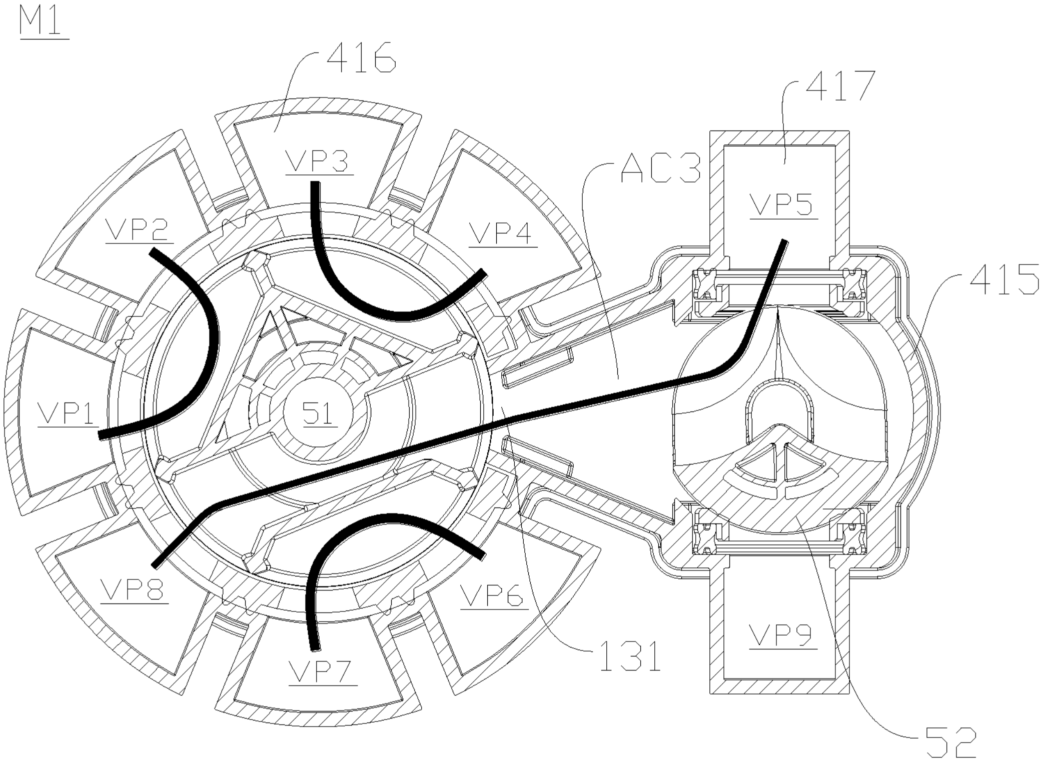
FIG. 24 is a schematic cross-sectional view of the control valve shown in FIG. 2 being in a first operating mode.

Further referring to FIGS. 20 and 24, in some embodiments, the number of first channels 416 is seven, the number of first end ports VP1 is seven, and correspondingly, the number of first communication ports 4141 is seven. The communication hole channel AC3 runs through the first side wall portion 414 to form a first hole port 131, and the seven first communication ports 4141 and the first hole port 131 are evenly distributed along the circumferential direction of the first side wall portion 414. The number of second channels 417 of the control valve is two, and the number of second end ports VP2 is two. The communication hole channel AC3 runs through the second side wall portion 415 to form a second hole port 132, and the second hole port 132 is located between the two second end ports VP2 along a circumferential direction of the second side wall portion 415.

Figure 30:
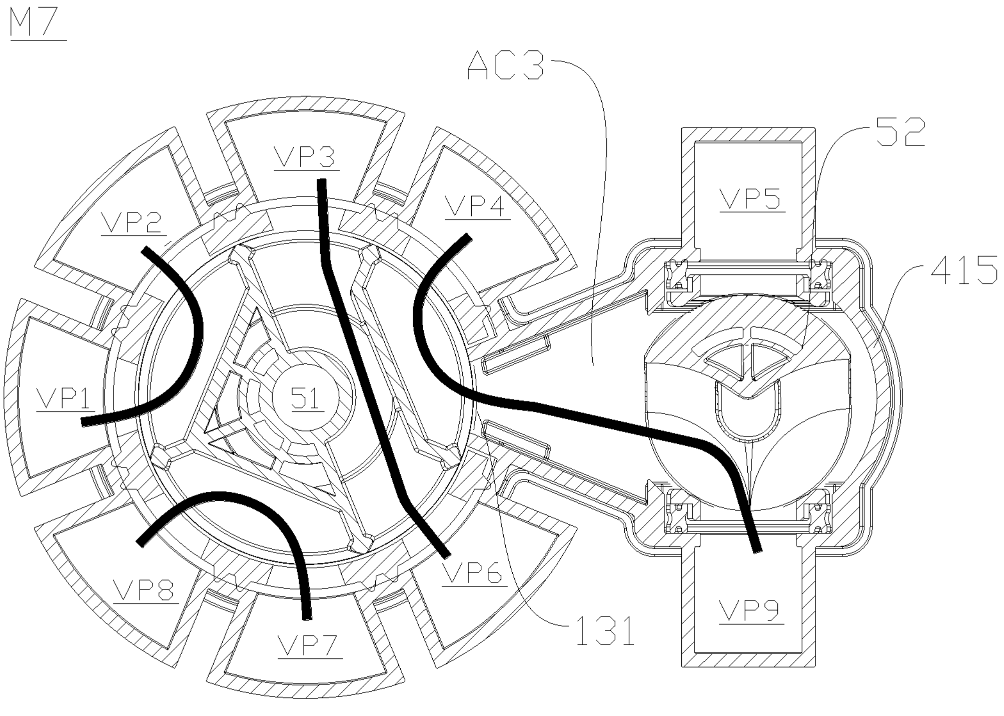
FIG. 30 is a schematic cross-sectional view of the control valve shown in FIG. 2 being in a seventh operating mode.
Figure 31:
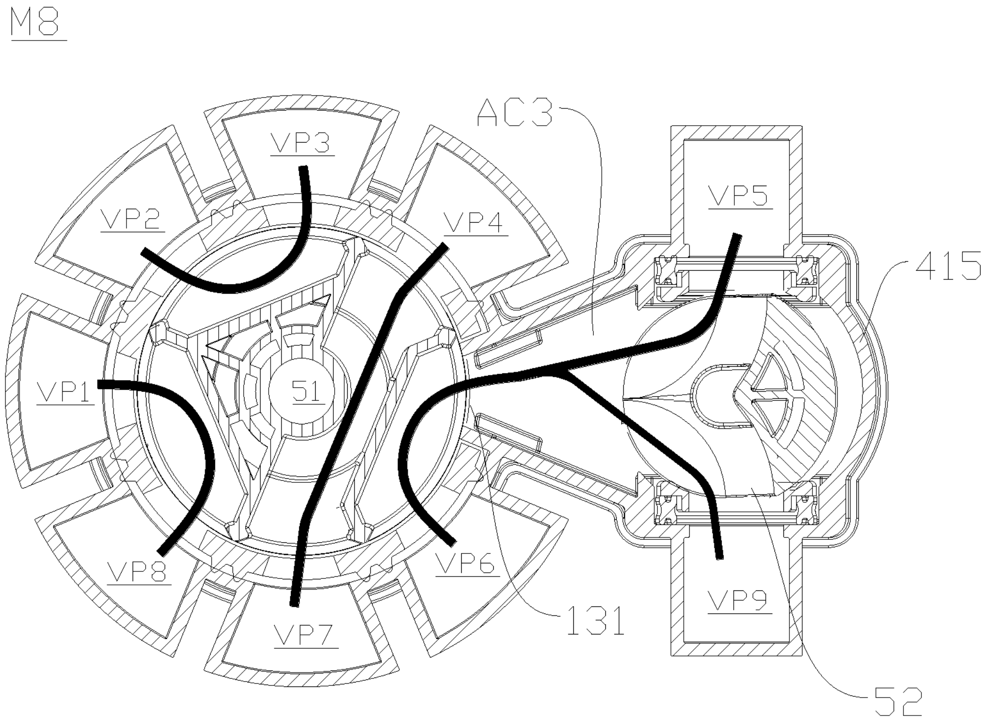
FIG. 31 is a schematic cross-sectional view of the control valve shown in FIG. 2 being in an eighth operating mode.

Further referring to FIGS. 20, 24, and 31, in some embodiments, the seven first channels 416 form seven first communication ports 4141, which are defined as a first port VP1, a second port VP2, a third port VP3, a fourth port VP4, a sixth port VP6, a seventh port VP7, and an eighth port VP8, respectively. The first port VP1, the second port VP2, the third port VP3, the fourth port VP4, the first hole port 131, the sixth port VP6, the seventh port VP7 and the eighth port VP8 are evenly arranged along the circumferential direction of the first valve core 51 in the listed sequence. In this case, as shown in FIG. 20, an angle between a connecting line passing through a center of the first valve core 51 and a midpoint of one of two adjacent first communication ports 4141 and a connecting line passing through the center of the first valve core 51 and a midpoint of the other one of two adjacent first communication ports 4141 may be 45 degrees, and an angle between the first hole port 131 and the first communication port 4141 adjacent to the first hole port may also be 45 degrees. The two second channels 417 form two second communication ports 4151, which are defined as a fifth port VP5 and a ninth port VP9, respectively. The control valve at least has any one of eight operating modes. Correspondingly, the first valve core 51 can be rotated to any one of the eight positions. The various operating modes of the control valve are introduced below. In order to make the communication situations of the valve ports of the control valve be clearly understood, the communication situations of the valve ports are schematically shown by black bold lines in FIGS. 24 to 31.

Referring to FIGS. 20 and 24, the control valve is in a first operating mode M1. The first valve core 51 is rotated to a first position, the first port VP1 and the second port VP2 are communicated through one of the three first communication cavities 511, the third port VP3 and the fourth port VP4 are communicated through another of the three first communication cavities 511, the sixth port VP6 and the seventh port VP7 are communicated through the other one of the three first communication cavities 511, and at least one of the fifth port VP5 and the ninth port VP9 is communicated with the eighth port VP8 through the second communication cavity 512, the communication hole channel AC3 and the third communication cavity 521. For example, FIG. 24 schematically shows the position of the second valve core 52 when the fifth port VP5 communicates with the communication hole channel AC3 through the third communication cavity. By rotating the second valve core 52, the ninth port VP9 may be communicated with the communication hole channel AC3, or both the fifth port VP5 and the ninth port VP9 may be communicated with the communication hole channel AC3. In the operating modes illustrated hereinafter, the solution that the fifth port VP5 being in communication with the communication hole channel AC3 is mainly taken as an example.

Figure 25:
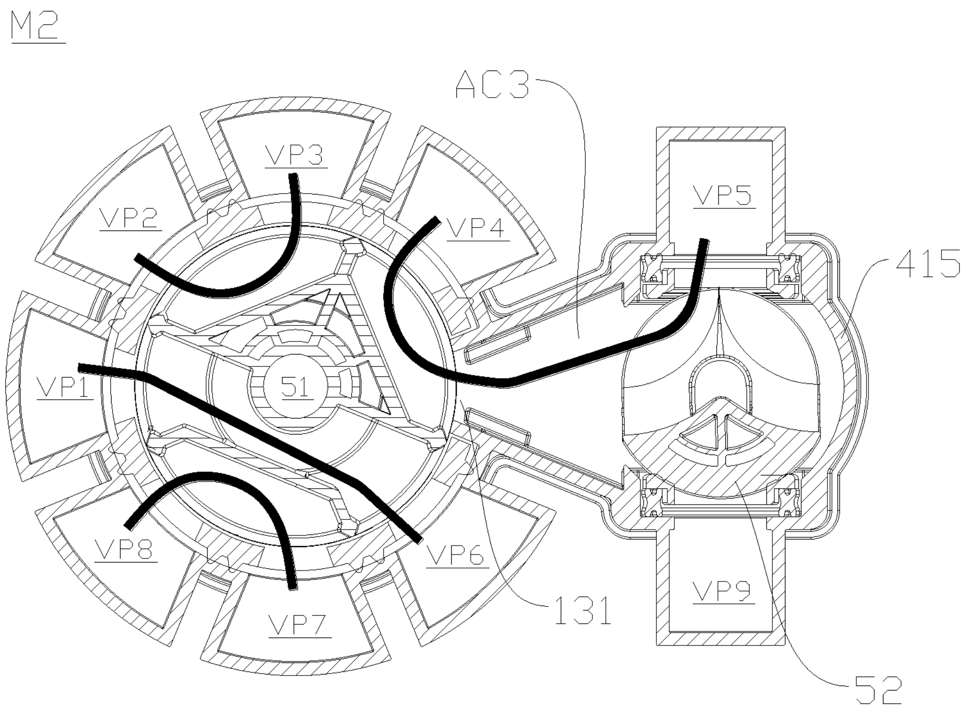
FIG. 25 is a schematic cross-sectional view of the control valve shown in FIG. 2 being in a second operating mode.

Referring to FIGS. 20 and 25, the control valve is in a second operating mode M2. The first valve core 51 is rotated to a second position, the third port VP3 and the second port VP2 are communicated through one of the three first communication cavities 511, at least one of the fifth port VP5 and the ninth port VP9 are communicated with the fourth port VP4 through another of the three first communication cavities 511, the communication hole channel AC3, and the third communication cavity 521, the seventh port VP7 and the eighth port VP8 are communicated through the other one of the three first communication cavities 511, and the sixth port VP6 and the first port VP1 are communicated through the second communication cavity 512.

Figure 26:
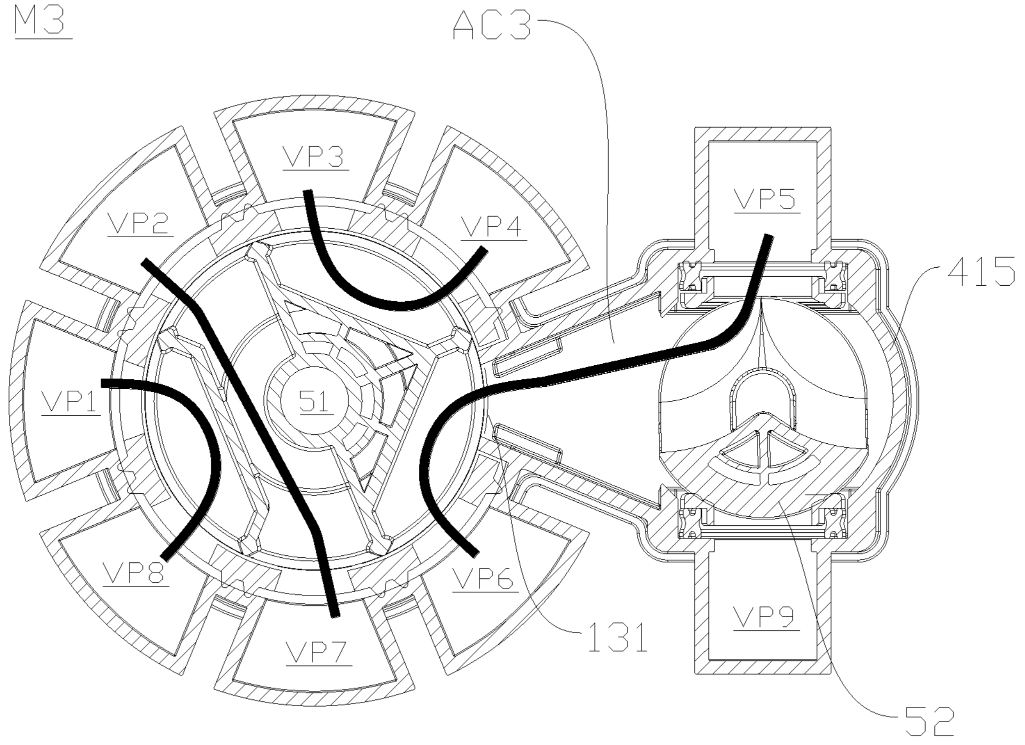
FIG. 26 is a schematic cross-sectional view of the control valve shown in FIG. 2 being in a third operating mode.

Referring to FIGS. 20 and 26, the control valve is in a third operating mode M3. The first valve core 51 is rotated to a third position, the first port VP1 and the eighth port VP8 are communicated through one of the three first communication cavities 511, the third port VP3 and the fourth port VP4 are communicated through another of the three first communication cavities 511, at least one of the fifth port VP5 and the ninth port VP9 is communicated with the sixth port VP6 through the other one of the three first communication cavities 511, the communication hole channel AC3, and the third communication cavity 521, and the second port VP2 and the seventh port VP7 are communicated through the second communication cavity 512.

Figure 27:
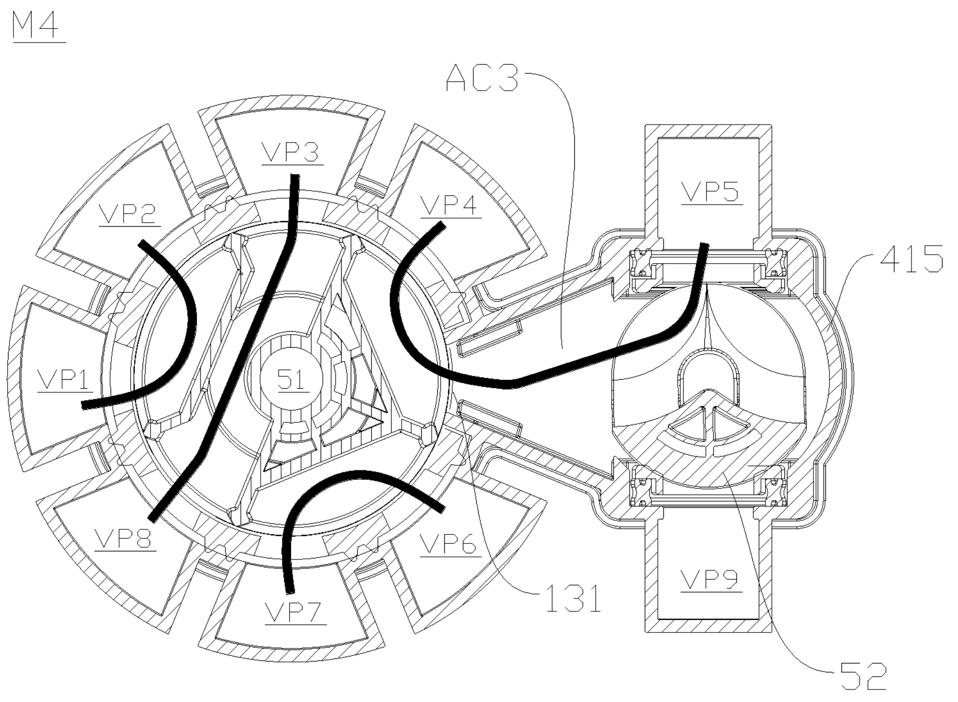
FIG. 27 is a schematic cross-sectional view of the control valve shown in FIG. 2 being in a fourth operating mode.

Referring to FIGS. 20 and 27, the control valve is in a fourth operating mode M4. The first valve core 51 is rotated to a fourth position, the first port VP1 and the second port VP2 are communicated through one of the three first communication cavities 511, at least one of the fifth port VP5 and the ninth port VP9 is communicated with the fourth port VP4 through another of the three first communication cavities 511, the communication hole channel AC3, and the third communication cavity 521, the sixth port VP6 and the seventh port VP7 are communicated through the other one of the three first communication cavities 511, and the third port VP3 and the eighth port VP8 are communicated through the second communication cavity 512.

Figure 28:
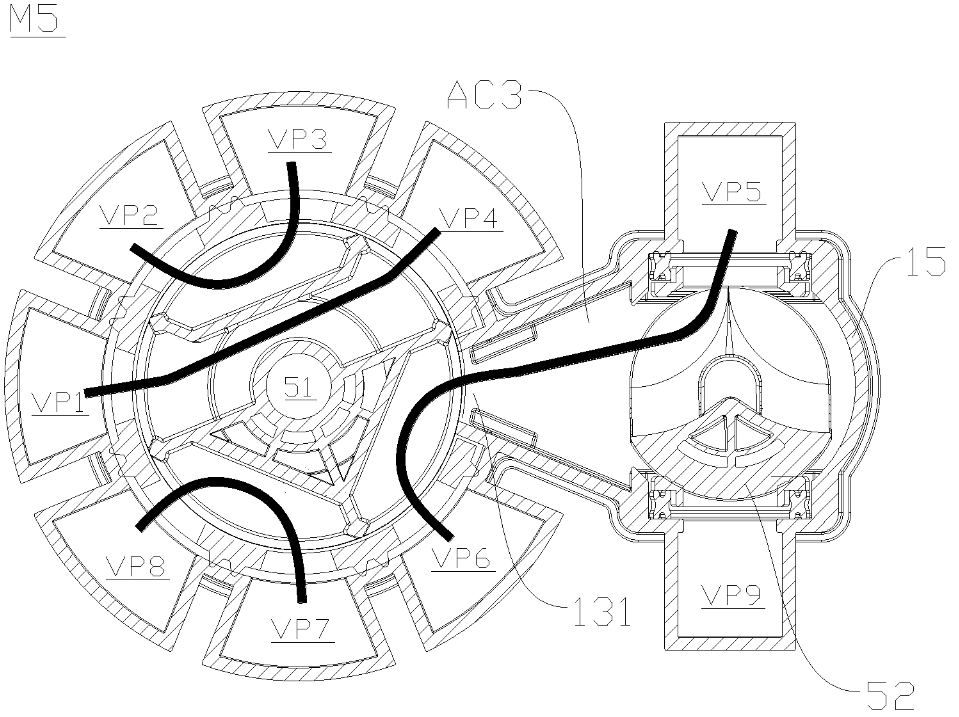
FIG. 28 is a schematic cross-sectional view of the control valve shown in FIG. 2 being in a fifth operating mode.

Referring to FIGS. 20 and 28, the control valve is in a fifth operating mode M5. The first valve core 51 is rotated to a fifth position, the third port VP3 and the second port VP2 are communicated through one of the three first communication cavities 511, the seventh port VP7 and the eighth port VP8 are communicated through another of the three first communication cavities 511, at least one of the fifth port VP5 and the ninth port VP9 is communicated with the sixth port VP6 through the other one of the three first communication cavities 511, the communication hole channel AC3, and the third communication cavity 521, and the first port VP1 and the fourth port VP4 are communicated through the second communication cavity 512.

Figure 29:
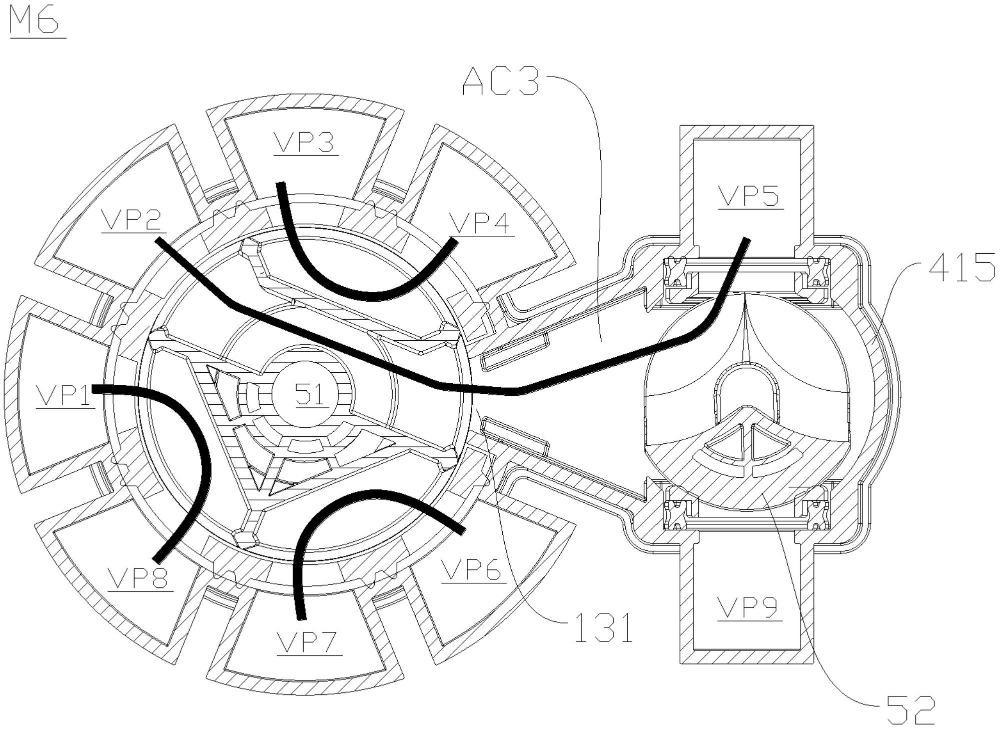
FIG. 29 is a schematic cross-sectional view of the control valve shown in FIG. 2 being in a sixth operating mode.

Referring to FIGS. 20 and 29, the control valve is in a sixth operating mode M6. The first valve core 51 is rotated to a sixth position. The first port VP1 and the eighth port VP8 are communicated through one of the three first communication cavities 511, the third port VP3 and the fourth port VP4 are communicated through another of the three first communication cavities 511, the sixth port VP6 and the seventh port VP7 are communicated through the other one of the three first communication cavities 511, and at least one of the fifth port VP5 and the ninth port VP9 is communicated with the second port VP2 through the second communication cavity 512, the communication hole channel AC3 and the third communication cavity 521.

Referring to FIGS. 20 and 30, the control valve is in a seventh operating mode M7. The first valve core 51 is rotated to a seventh position, the first port VP1 and the second port VP2 are communicated through one of the three first communication cavities 511, the seventh port VP7 and the eighth port VP8 are communicated through another of the three first communication cavities 511, at least one of the fifth port VP5 and the ninth port VP9 is communicated with the fourth port VP4 through the other one of the three first communication cavities 511, the communication hole channel AC3, and the third communication cavity 521, and the sixth port VP6 and the third port VP3 are communicated through the second communication cavity 512. The position of the second valve core 52 when the ninth port VP9 is communicated with the communication hole channel AC3 through the third communication cavity 521 is schematically shown in FIG. 31.

Referring to FIGS. 20 and 31, the control valve is in an eighth operating mode M8. The first valve core 51 is rotated to an eighth position, the first port VP1 and the eighth port VP8 are communicated through one of the three first communication cavities 511, the second port VP2 and the third port VP3 are communicated through another of the three first communication cavities 511, at least one of the fifth port VP5 and the ninth port VP9 is communicated with the sixth port VP6 through the other one of the three first communication cavities 511, the communication hole channel AC3, and the third communication cavity 521, and the fourth port VP4 and the seventh port VP7 are communicated through the second communication cavity 512. The position of the second valve core 52 when both the ninth port VP9 and the fifth port VP5 are communicated with the communication hole channel AC3 through the third communication cavity 521 is schematically shown in FIG. 31.

In some embodiments, in any one of the eight operating modes of the control valve 1, the angle of rotation of the first valve core 51 between two adjacent operating modes is 45 degrees. Further, as shown in FIGS. 24 to 29, the second valve core 52 is rotated to a ninth position, and the fifth port VP5 and the communication hole channel AC3 are communicated through the third communication cavity 521. As shown in FIG. 30, the second valve core 52 is rotated to a tenth position, and the ninth port VP9 and the communication hole channel AC3 are communicated through the third communication cavity 521. As shown in FIG. 31, the second valve core 52 is rotated to a position between the ninth position and the tenth position, and both the fifth port VP5 and the ninth port VP9 are communicated with the communication hole channel AC3 through the third communication cavity 521.

In an embodiment, when the control valve has a larger number of valve ports, in order to realize switching of the communication modes between multiple valve ports, the control valve may include three or more valve cores.

Figure 32:
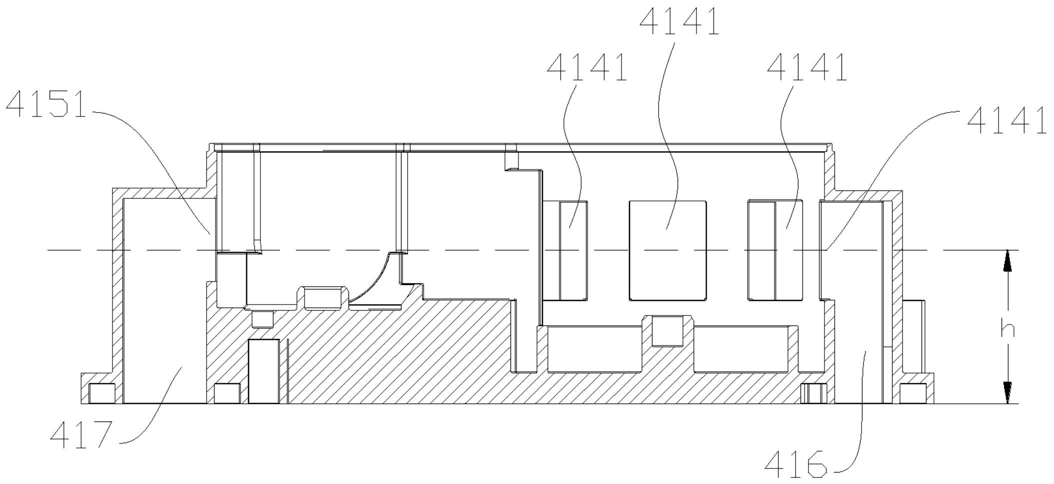
FIG. 32 is a schematic cross-sectional view of the valve body shown in FIG. 12 being sectioned at another position.

Further referring to FIG. 32, in some embodiments, the first communication ports 4141 are arranged along the circumferential direction of the first side wall portion 414, and the second communication ports 4151 are arranged along the circumferential direction of the second side wall portion 415. In the height direction of the control valve 1, centers of the first communication ports 4141 and centers of the second communication ports 4151 are located at a same height of the control valve 1, that is, a plane passing through the centers of the first communication ports 4141 and the centers of the second communication ports 4151 is perpendicular to the height direction of the control valve 1. Distances between the centers of the first communication ports 4141 and a bottom end surface of the valve body 41, and distances between the centers of the second communication ports 4151 and the bottom end surface of the valve body 41 may be h, and the specific value of h may be set according to requirements of user. Through the above arrangement, the communication ports can be arranged neatly, which is beneficial for reducing the size of the control valve 1 along the height direction.

Figure 33:
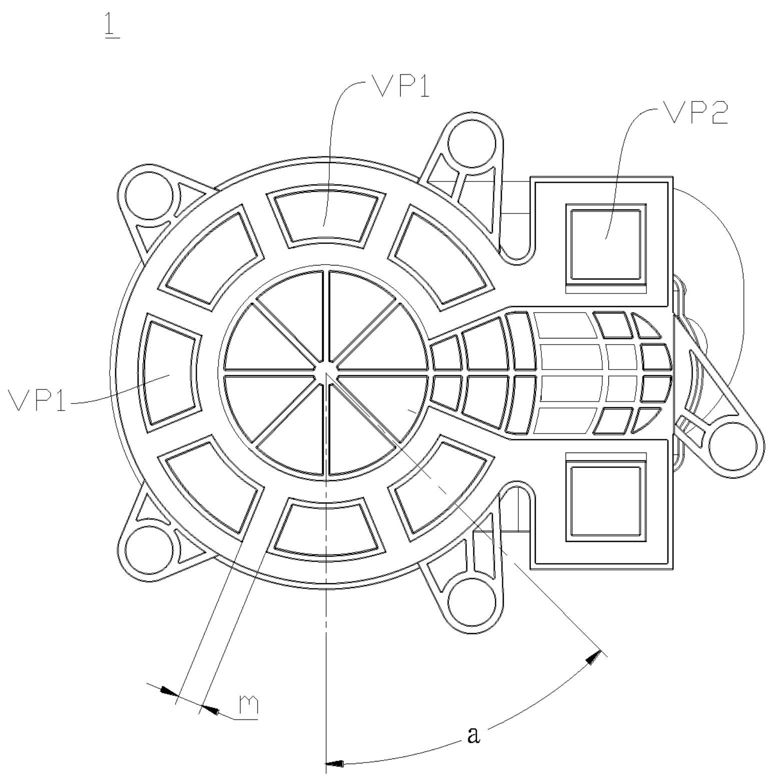
FIG. 33 is another orthographic view of the control valve shown in FIG. 2.

Optionally, the control valve 1 has seven first channels 416 and two second channels 417, seven first end ports VP1 are formed by the seven first channels 416, and two second end ports VP2 are formed by the two second channels 102. Referring to FIG. 33, an angle "a" defined by the axis of the first chamber AC1 and centers of two adjacent first end ports VP1 is 45 degrees, and a minimum distance "m" between inner walls of two adjacent first end ports VP1 is greater than or equal to 6 millimeters. A cross-sectional area of the first end port VP1 is equal to a cross-sectional area of the second end port VP2, so that the first end port VP1 and the second end port VP2 have the same fluid flow area.

As shown in FIGS. 2 to 20, in some embodiments, the valve body 41 further includes a first connecting portion 4101, and the first connecting portion 4101 is fixedly connected to or integrally formed with the first side wall portion 414. Part of each of the first channels 416 is located in the first connecting portion 4101. A cross-section of the first side wall portion 414 may be of a circular ring structure having an opening, and an inner surface of a cross section of the first connecting portion 4101 is of a fan-shaped structure. An arc length of an arc, which is away from the first side wall portion 414, of the cross section of the first connecting portion 4101 is greater than an arc length of an arc, which is close to the first side wall portion 414, of the cross section of the first connecting portion 4101. Herein, the cross section is a section formed by cutting the valve body 41 along a direction perpendicular to the height direction of the valve body 41. In some embodiments, the valve body 41 further includes a second connecting portion 4102, and the second connecting portion 4102 is fixedly connected to or integrally formed with the second side wall portion 415. The second channel 102 runs through the second connecting portion 4102, and an inner surface of a cross-section of the second connecting portion 4102 is of a rectangular structure.

In summary, according to the control valve 1 provided by the embodiments of the present application, the valve cores of the control valve 1 includes the first valve core 51 and the second valve core 52, the first valve core 51 and the second valve core 52 are rotatable to communicate corresponding end ports VP of the control valve 1, facilitating the realization of various flow modes of the control valve 1. The valve body 41 includes the first position-limiting portion 412 and the second position-limiting portion 413, the first position-limiting portion 412 can be in position-limiting fit with the first matching portion 510 of the first valve core 51 to limit the first valve core 51, and the second position-limiting portion 413 can be in position-limiting fit with the second matching portion 520 of the second valve core 52 to limit the second valve core 52. The main body of the first valve core 51 and/or the main body of the second valve core 52 is configured as a spherical structure, so that the valve cores can deflect around the corresponding position-limiting portions. During the manufacture or the assembly process of the control valve 1, the deflection of the valve cores facilitates the transmission connection between the drive shafts and the corresponding drive members, so as to reduce the unstable fit between the two drive shafts and the two drive members caused by manufacturing or assembly errors of the control valve 1, which facilitates popularization and application.

It should be noted that the above embodiments are only used to illustrate the present application rather than limit the technical solutions described in the present application, for example, definitions for directions such as "front", "back", "left", "right", "up", "down". Although this specification has described the present application in detail with reference to the above embodiments, it should be understood that those skilled in the art can still modify, combine or replace the present application, all technical solutions and improvements thereof that do not deviate from the spirit and the scope of the present application shall fall within the scope of the claims of the present application.

The invention claimed is:

1. A control valve, comprising a valve body and valve cores, wherein the valve cores comprise a first valve core and a second valve core, the control valve has a first chamber and a second chamber in communication with each other, the first chamber and the second chamber are arranged along a direction intersecting with a height direction of the control valve, at least part of the first valve core is arranged in the first chamber and is rotatable, and at least part of the second valve core is arranged in the second chamber and is rotatable;

the valve body comprises a bottom wall portion, a first position-limiting portion, and a second position-limiting portion, the bottom wall portion is located at a side of the valve cores in an axial direction of the valve cores, the first position-limiting portion is fixedly connected to the bottom wall portion, the second position-limiting portion is fixedly connected to the bottom wall portion, the first valve core comprises a first matching portion that is in position-limiting fit with the first position-limiting portion, and the second valve core comprises a second matching portion that is in position-limiting fit with the second position-limiting portion;

a main body of the first valve core is of a spherical structure, the first valve core is configured to be deflected relative to the first position-limiting portion in a plane where the height direction of the control valve is located, so that there is an angle between an axis of the first valve core and an axis of a chamber wall of the first chamber; and/or, a main body of the second valve core is of a spherical structure, the second valve core is configured to be deflected relative to the second position-limiting portion in the plane where the height direction of the control valve is located, so that there is an angle between an axis of the second valve core and an axis of a chamber wall of the second chamber, the control valve further comprises a driving assembly, wherein the driving assembly is located at a side of the valve body along the height direction of the control valve, the driving assembly comprises a housing, a first drive member, and a second drive member, the housing has an accommodation cavity, and the first drive member and the second drive member are located in the accommodation cavity; and the control valve further comprises a first drive shaft and a second drive shaft, wherein the first drive shaft is in transmission connection with the first drive member, and the first drive shaft and the first valve core are of an integrated structure or in transmission connection with each other; the second drive shaft is in transmission connection with the second drive member, and the second drive shaft and the second valve core are of an integrated structure or in transmission connection with each other.

2. The control valve according to claim 1, wherein the first drive shaft and the first valve core are of the integrated structure, the second drive shaft and the second valve core are of a split structure and are in transmission connection with each other, the main body of the first valve core is of a column structure, the first valve core is limited by the first position-limiting portion, and the first valve core and the first drive shaft are coaxial with the chamber wall of the first chamber; and the main body of the second valve core is of the spherical structure, and the second valve core is configured to be deflected relative to the second position-limiting portion in the plane where the height direction of the control valve is located to allow an angle to be formed between an axis of the second drive shaft and the axis of the chamber wall of the second chamber.

3. The control valve according to claim 2, wherein the valve body further comprises a first side wall portion and a second side wall portion, the first side wall portion forms a peripheral wall of the first chamber or is at least part of the peripheral wall of the first chamber, and the second side wall portion forms a peripheral wall of the second chamber or is at least part of the peripheral wall of the second chamber; the control valve is provided with channels, the channels comprises at least one first channel and at least one second channel, the at least one first channel runs through the first side wall portion to form at least one first communication port, and the at least one second channel runs through the second side wall portion to form at least one second communication port; and the control valve further comprises a first seal and at least one second seal, wherein the first seal has at least one first hole channel, the number of the at least one first hole channel is the same as the number of the at least one first communication port, the at least one first hole channel communicates with a corresponding first communication port, the first seal is sandwiched between the first side wall portion and the first valve core, the first seal is coaxial with the first valve core, and a height of the first seal matches a height of the main body of the first valve core; and the number of the at least one second seal is the same as the number of the at least one second communication port, the at least one second seal has at least one second hole channel, the at least one second hole channel communicates with a corresponding second communication port, the at least one second seal is sandwiched between part of a side surface of the second valve core and part of a wall surface of the second side wall portion, a gap is reserved between another part of the side surface of the second valve core and another part of the wall surface of the second side wall portion, and a gap is provided between an end face of the main body of the second valve core and the valve body along the height direction of the control valve.

4. The control valve according to claim 3, wherein the first drive shaft comprises a toothed portion, the first drive member comprises a first output gear, the first output gear has a toothed hole, and at least part of the toothed portion is arranged in the toothed hole; and the second drive shaft comprises a connecting portion, at least part of an outer surface of the connecting portion comprises two non-arc-shaped surfaces arranged opposite to each other and an arc-shaped surface located between the two non-arc-shaped surfaces, the second drive member comprises a second output gear, the second output gear has a connecting hole, at least part of a hole wall surface of the connecting hole comprises two non-arc-shaped wall surfaces arranged opposite to each other and an arc-shaped wall surface located between the two non-arc-shaped wall surfaces, the two non-arc-shaped wall surfaces are arranged close to and face the non-arc-shaped surfaces, respectively, and at least part of the connecting portion is arranged in the connecting hole.

5. The control valve according to claim 4, wherein the first valve core comprises at least one first communication cavity and at least one second communication cavity that are isolated from each other, wherein the at least one first communication cavity is a groove structure recessed from an outer peripheral surface of the first valve core toward an interior of the first valve core, and the at least one second communication cavity runs through the first valve core; the second valve core comprises a third communication cavity, wherein the third communication cavity is a groove structure recessed from an outer surface of the second valve core toward an interior of the second valve core;

the first side wall portion forms at least part of a wall of the first chamber, and the second side wall portion forms at least part of a wall of the second chamber; the control valve is provided with at least one first channel and at least one second channel, wherein the at least one first channel runs through the first side wall portion to form a plurality of first communication ports, and the at least one second channel runs through the second side wall portion to form at least one second communication port; and at least two corresponding first communication ports of the plurality of first communication ports are communicated with each other through at least one of the at least one first communication cavity and the at least one second communication cavity; and one or more of the plurality of first communication ports and at least one of the at least one second communication port are communicated with each other through one of the at least one first communication cavity and the at least one second communication cavity, a communication hole channel, and the third communication cavity.

6. The control valve according to claim 3, wherein the first valve core comprises at least one first communication cavity and at least one second communication cavity that are isolated from each other, wherein the at least one first communication cavity is a groove structure recessed from an outer peripheral surface of the first valve core toward an interior of the first valve core, and the at least one second communication cavity runs through the first valve core; the second valve core comprises a third communication cavity, wherein the third communication cavity is a groove structure recessed from an outer surface of the second valve core toward an interior of the second valve core;

the first side wall portion forms at least part of a wall of the first chamber, and the second side wall portion forms at least part of a wall of the second chamber; the control valve is provided with at least one first channel and at least one second channel, wherein the at least one first channel runs through the first side wall portion to form a plurality of first communication ports, and the at least one second channel runs through the second side wall portion to form at least one second communication port; and at least two corresponding first communication ports of the plurality of first communication ports are communicated with each other through at least one of the at least one first communication cavity and the at least one second communication cavity; and one or more of the plurality of first communication ports and at least one of the at least one second communication port are communicated with each other through one of the at least one first communication cavity and the at least one second communication cavity, a communication hole channel, and the third communication cavity.

7. The control valve according to claim 2, wherein the first valve core comprises at least one first communication cavity and at least one second communication cavity that are isolated from each other, wherein the at least one first communication cavity is a groove structure recessed from an outer peripheral surface of the first valve core toward an interior of the first valve core, and the at least one second communication cavity runs through the first valve core; the second valve core comprises a third communication cavity, wherein the third communication cavity is a groove structure recessed from an outer surface of the second valve core toward an interior of the second valve core;

the control valve further comprises a first side wall portion and a second side wall portion, wherein the first side wall portion forms at least part of a wall of the first chamber, and the second side wall portion forms at least part of a wall of the second chamber; the control valve is provided with at least one first channel and at least one second channel, wherein the at least one first channel runs through the first side wall portion to form a plurality of first communication ports, and the at least one second channel runs through the second side wall portion to form at least one second communication port; and at least two corresponding first communication ports of the plurality of first communication ports are communicated with each other through at least one of the at least one first communication cavity and the at least one second communication cavity; and one or more of the plurality of first communication ports and at least one of the at least one second communication port are communicated with each other through one of the at least one first communication cavity and the at least one second communication cavity, a communication hole channel, and the third communication cavity.

8. The control valve according to claim 1, wherein the first position-limiting portion is one of a first protrusion structure and a first groove structure, the first matching portion is the other of the first protrusion structure and the first groove structure; the second position-limiting portion is one of a second protrusion structure and a second groove structure, and the second matching portion is the other of the second protrusion structure and the second groove structure; and the first protrusion structure is inserted in the first groove structure and the first protrusion structure is in position-limiting fit with the first groove structure, and the second protrusion structure is inserted in the second groove structure and the second protrusion structure is in position-limiting fit with the second groove structure.

9. The control valve according to claim 8, wherein the first position-limiting portion is the first protrusion structure, the first protrusion structure protrudes from the bottom wall portion, the first matching portion is the first groove structure, the first groove structure extends from a surface of the first valve core facing the bottom wall portion toward an interior of the first valve core; and the second position-limiting portion is the second protrusion structure, the second protrusion structure protrudes from the bottom wall portion, the second matching portion is the second groove structure, the second groove structure extends from a surface of the second valve core facing the bottom wall portion toward an interior of the second valve core.

10. The control valve according to claim 9, wherein the second protrusion structure is in clearance fit with the second groove structure, and a distance dl between an outer wall surface of the second protrusion structure and an inner wall surface of the second groove structure satisfies: $0 \leq d1 \leq 0.06$ mm.

11. The control valve according to claim 10, wherein the first drive member comprises a first motor and a first output gear in transmission connection with the first motor, and the second drive member comprises a second motor and a second output gear in transmission connection with the second motor;

the valve body further comprises a cover portion, at least part of the first valve core and at least part of the second valve core are arranged between the bottom wall portion and the cover portion, the cover portion has a first through hole and a second through hole; wherein the first drive shaft runs through the first through hole to be in transmission connection with the first output gear, and the second drive shaft runs through the second through hole to be in transmission connection with the second output gear; and the first through hole is arranged coaxially with the first output gear and the first drive shaft, the second through hole is in clearance fit with the second drive shaft, and a distance d2 between a hole wall of the second through hole and a shaft surface, corresponding to the second through hole in position, of the second drive shaft satisfies: $0 \leq d2 \leq 0.05$ mm.

12. The control valve according to claim 11, wherein a distance d3 between a midpoint on a surface facing away from the second valve core, of the second drive shaft and the axis of the chamber wall of the first chamber satisfies: $0 \leq d3 \leq 0.1$ mm.

13. The control valve according to claim 11, wherein the housing of the driving assembly comprises a lower housing, wherein the lower housing has a third through hole, and the second drive shaft runs through the second through hole and the third through hole to be in transmission connection with the second output gear, and the control valve further comprises a first oil seal and a second oil seal, wherein both the first oil seal and the second oil seal are sleeved on an outer periphery of the second drive shaft, the first oil seal is sandwiched between the cover portion and the second drive shaft, the second oil seal is sandwiched between the lower housing and the second drive shaft, and a compression space is respectively provided between the first oil seal and an outer surface of the second drive shaft, and between the second oil seal and the outer surface of the second drive shaft.

14. The control valve according to claim 9, wherein the first valve core comprises at least one first communication cavity and at least one second communication cavity that are isolated from each other, wherein the at least one first communication cavity is a groove structure recessed from an outer peripheral surface of the first valve core toward an interior of the first valve core, and the at least one second communication cavity runs through the first valve core; the second valve core comprises a third communication cavity, wherein the third communication cavity is a groove structure recessed from an outer surface of the second valve core toward an interior of the second valve;

the control valve further comprises a first side wall portion and a second side wall portion, wherein the first side wall portion forms at least part of a wall of the first chamber, and the second side wall portion forms at least part of a wall of the second chamber; the control valve is provided with at least one first channel and at least one second channel, wherein the at least one first channel runs through the first side wall portion to form a plurality of first communication ports, and the at least one second channel runs through the second side wall portion to form at least one second communication port; and at least two corresponding first communication ports of the plurality of first communication ports are communicated with each other through at least one of the at least one first communication cavity and the at least one second communication cavity; and one or more of the plurality of first communication ports and at least one of the at least one second communication port are communicated with each other through one of the at least one first communication cavity and the at least one second communication cavity, a communication hole channel, and the third communication cavity.

15. The control valve according to claim 1, wherein the first valve core comprises at least one first communication cavity and at least one second communication cavity that are isolated from each other, wherein the at least one first communication cavity is a groove structure recessed from an outer peripheral surface of the first valve core toward an interior of the first valve core, and the at least one second communication cavity runs through the first valve core; the second valve core comprises a third communication cavity, wherein the third communication cavity is a groove structure recessed from an outer surface of the second valve core toward an interior of the second valve core;

the control valve further comprises a first side wall portion and a second side wall portion, wherein the first side wall portion forms at least part of a wall of the first chamber, and the second side wall portion forms at least part of a wall of the second chamber; the control valve is provided with at least one first channel and at least one second channel, wherein the at least one first channel runs through the first side wall portion to form a plurality of first communication ports, and the at least one second channel runs through the second side wall portion to form at least one second communication port; and at least two corresponding first communication ports of the plurality of first communication ports are communicated with each other through at least one of the at least one first communication cavity and the at least one second communication cavity; and one or more of the plurality of first communication ports and at least one of the at least one second communication port are communicated with each other through one of the at least one first communication cavity and the at least one second communication cavity, a communication hole channel, and the third communication cavity.

16. The control valve according to claim 15, wherein the at least one first channel comprises seven first channels, the plurality of first communication ports comprise seven first communication ports, the valve body also has the communication hole channel, the communication hole channel communicates the first chamber with the second chamber, the communication hole channel runs through the first side wall portion to form a first hole port, and the seven first communication ports and the first hole port are evenly distributed along a circumferential direction of the first side wall portion;

the at least one first communication cavity comprises three first communication cavities, the at least one second communication cavity comprises one second communication cavity, and along a radial direction of the first valve core, two of the three first communication cavities adjacent to each other are located on one side of the first valve core, and the one second communication cavity and the other one of the three first communication cavities are located on an opposite side of the first valve core; and the seven first communication ports are defined as a first port, a second port, a third port, a fourth port, a sixth port, a seventh port, and an eighth port, respectively, the first port, the second port, the third port, the fourth port, the first hole port, the sixth port, the seventh port, and the eighth port are arranged sequentially along the circumferential direction of the first side wall portion, the at least one second communication port comprises two second communication ports defined as a fifth port and a ninth port, respectively, and the control valve at least has any one of the following eight operating modes:

in a first operating mode, the first valve core is rotated to a first position, the first port and the second port are communicated through one of the three first communication cavities, the third port and the fourth port are communicated through another of the three first communication cavities, the sixth port and the seventh port are communicated through the other one of the three first communication cavities, and at least one of the fifth port and the ninth port is communicated with the eighth port through the one second communication cavity, the communication hole channel and the third communication cavity;

in a second operating mode, the first valve core is rotated to a second position, the third port and the second port are communicated through one of the three first communication cavities, at least one of the fifth port and the ninth port is communicated with the fourth port through another of the three first communication cavities, the communication hole channel and the third communication cavity, the seventh port and the eighth port are communicated through the other one of the three first communication cavities, and the sixth port and the first port are communicated through the one second communication cavity;

in a third operating mode, the first valve core is rotated to a third position, the first port and the eighth port are communicated through one of the three first communication cavities, the third port and the fourth port are communicated through another of the three first communication cavities, at least one of the fifth port and the ninth port is communicated with the sixth port through the other one of the three first communication cavities, the communication hole channel and the third communication cavity, and the second port and the seventh port are communicated through the one second communication cavity;

in a fourth operating mode, the first valve core is rotated to a fourth position, the first port and the second port are communicated through one of the three first communication cavities, at least one of the fifth port and the ninth port is communicated with the fourth port through another of the three first communication cavities, the communication hole channel and the third communication cavity, the sixth port and the seventh port are communicated through the other one of the three first communication cavities, and the third port and the eighth port are communicated through the one second communication cavity;

in a fifth operating mode, the first valve core is rotated to a fifth position, the third port and the second port are communicated through one of the three first communication cavities, the seventh port and the eighth port are communicated through another of the three first communication cavities, at least one of the fifth port and the ninth port is communicated with the sixth port through the other one of the three first communication cavities, the communication hole channel and the third communication cavity, and the first port and the fourth port are communicated through the one second communication cavity;

in a sixth operating mode, the first valve core is rotated to a sixth position, the first port and the eighth port are communicated through one of the three first communication cavities, the third port and the fourth port are communicated through another of the three first communication cavities, the sixth port and the seventh port are communicated through the other one of the three first communication cavities, and at least one of the fifth port and the ninth port is communicated with the second port through the one second communication cavity, the communication hole channel and the third communication cavity;

in a seventh operating mode, the first valve core is rotated to a seventh position, the first port and the second port are communicated through one of the three first communication cavities, the seventh port and the eighth port are communicated through another of the three first communication cavities, at least one of the fifth port and the ninth port is communicated with the fourth port through the other one of the three first communication cavities, the communication hole channel and the third communication cavity, and the sixth port and the third port are communicated through the one second communication cavity; and in an eighth operating mode, the first valve core is rotated to an eighth position, the first port and the eighth port are communicated through one of the three first communication cavities, the second port and the third port are communicated through another of the three first communication cavities, at least one of the fifth port and the ninth port is communicated with the sixth port through the other one of the three first communication cavities, the communication hole channel and the third communication cavity, and the fourth port and the seventh port are communicated through the one second communication cavity.

17. The control valve according to claim 16, wherein, in any one of the eight operating modes of the control valve, the fifth port and the communication hole channel are communicated through the third communication cavity when the second valve core is rotated to a ninth position, the ninth port and the communication hole channel are communicated through the third communication cavity when the second valve core is rotated to a tenth position, and both the fifth port and the ninth port are communicated with the communication hole channel through the third communication cavity when the second valve core is rotated to a position between the ninth position and the tenth position.

18. The control valve according to claim 15, wherein along the height direction of the control valve, one first communication port is provided in the first side wall portion, and one second communication port is provided in the second side wall portion;

the valve body further comprises a first connecting portion, wherein the first connecting portion is fixedly connected to or integrally formed with the first side wall portion, and the at least one first channel runs through the first connecting portion, and a cross section along a direction perpendicular to a height direction of the first side wall portion, of the first side wall portion is of a circular ring structure having an opening, an inner surface of a cross section of the first connecting portion is of a fan-shaped structure; and an arc length of an arc, which is away from an axis of the first side wall portion, of the fan-shaped structure is greater than an arc length of an arc, which is close to the axis of the first side wall portion, of the fan-shaped structure.

19. The control valve according to claim 1, wherein the first valve core comprises at least one first communication cavity and at least one second communication cavity that are isolated from each other, wherein the at least one first communication cavity is a groove structure recessed from an outer peripheral surface of the first valve core toward an interior of the first valve core, and the at least one second communication cavity runs through the first valve core; the second valve core comprises a third communication cavity, wherein the third communication cavity is a groove structure recessed from an outer surface of the second valve core toward an interior of the second valve core;

the control valve further comprises a first side wall portion and a second side wall portion, wherein the first side wall portion forms at least part of a wall of the first chamber, and the second side wall portion forms at least part of a wall of the second chamber; the control valve is provided with at least one first channel and at least one second channel, wherein the at least one first channel runs through the first side wall portion to form a plurality of first communication ports, and the at least one second channel runs through the second side wall portion to form at least one second communication port; and at least two corresponding first communication ports of the plurality of first communication ports are communicated with each other through at least one of the at least one first communication cavity and the at least one second communication cavity; and one or more of the plurality of first communication ports and at least one of the at least one second communication port are communicated with each other through one of the at least one first communication cavity and the at least one second communication cavity, a communication hole channel, and the third communication cavity.

* * * * *